(12) United States Patent
Taguchi et al.

(10) Patent No.: US 8,615,613 B2
(45) Date of Patent: Dec. 24, 2013

(54) PROGRAM EXECUTED IN INFORMATION PROCESSING APPARATUS TO CONTROL PERIPHERAL APPARATUS

(75) Inventors: Yuuki Taguchi, Tokyo (JP); Taketo Ochiai, Tokyo (JP); Hiroshi Komuro, Wako (JP)

(73) Assignee: Canon Denshi Kabushiki Kaisha, Chichibu-Shi, Saitama-Ken (JP)

(*) Notice: Subject to any disclaimer, the term of this patent is extended or adjusted under 35 U.S.C. 154(b) by 130 days.

(21) Appl. No.: 12/827,580

(22) Filed: Jun. 30, 2010

(65) Prior Publication Data

US 2011/0160875 A1    Jun. 30, 2011

(30) Foreign Application Priority Data

| Jul. 3, 2009 | (JP) | 2009-158753 |
| Jul. 3, 2009 | (JP) | 2009-159098 |
| Jul. 17, 2009 | (JP) | 2009-168328 |
| Jun. 28, 2010 | (JP) | 2010-145827 |

(51) Int. Cl.
   *G06F 3/00* (2006.01)
   *G05B 11/01* (2006.01)

(52) U.S. Cl.
   USPC ............. 710/18; 710/14; 710/15; 710/19; 700/17; 715/700; 715/716; 715/719; 715/722; 715/764

(58) Field of Classification Search
   None
   See application file for complete search history.

(56) References Cited

U.S. PATENT DOCUMENTS

| 7,805,720 B2* | 9/2010 | Chang et al. ............... 717/173 |
| 2004/0001504 A1 | 1/2004 | Rostron et al. |
| 2004/0230708 A1 | 11/2004 | Juan |
| 2004/0246762 A1 | 12/2004 | Inada |
| 2007/0198996 A1 | 8/2007 | Chiu et al. |
| 2008/0123114 A1 | 5/2008 | Hirosugi et al. |
| 2008/0133743 A1 | 6/2008 | Yamamuro |
| 2008/0141284 A1 | 6/2008 | Tomizu |
| 2009/0074387 A1* | 3/2009 | Adachi ..................... 386/124 |
| 2009/0307679 A1* | 12/2009 | Lee et al. .................. 717/168 |
| 2010/0188698 A1* | 7/2010 | Koizumi ................... 358/1.15 |
| 2011/0038005 A1* | 2/2011 | Ochiai et al. .............. 358/1.15 |
| 2011/0125937 A1* | 5/2011 | Ito et al. ................... 710/36 |
| 2011/0160875 A1* | 6/2011 | Taguchi et al. ............ 700/17 |

FOREIGN PATENT DOCUMENTS

| JP | 5-265911 A | 10/1993 |
| JP | 5-296789 A | 11/1993 |
| JP | 7-271946 A | 10/1995 |
| JP | 2001-256170 A | 9/2001 |
| JP | 2002-99496 A | 4/2002 |

(Continued)

OTHER PUBLICATIONS

European Search Report dated Aug. 11, 2010 concernring the corresponding European Patent Application 10/167712.8-2211.

*Primary Examiner* — Tanh Nguyen
(74) *Attorney, Agent, or Firm* — Fitzpatrick, Cella, Harper & Scinto

(57) ABSTRACT

A control program for using a peripheral apparatus is loaded from the peripheral apparatus to the memory of an information processing apparatus. A management program manages the display form of a control object based on execution of the control program. The control object displayed on the information processing apparatus can be switched between the non-display state and the display state. For example, the management program causes the information processing apparatus to execute return from the non-display state to the display state in synchronism with the user manipulation of the peripheral apparatus.

6 Claims, 13 Drawing Sheets

(56) References Cited

FOREIGN PATENT DOCUMENTS

| | | | |
|---|---|---|---|
| JP | 2004-302658 A | 10/2004 | |
| JP | 2004-342068 A | 12/2004 | |
| JP | 2005-115427 A | 4/2005 | |
| JP | 2005-321907 A | 11/2005 | |
| JP | 2008-159033 A | 7/2008 | |
| WO | 2008067432 A1 | 6/2008 | |

* cited by examiner

PROGRAM EXECUTED IN INFORMATION PROCESSING APPARATUS TO CONTROL PERIPHERAL APPARATUS

BACKGROUND OF THE INVENTION

1. Field of the Invention

The present invention relates to an image reading apparatus and peripheral apparatus such as an image scanner, image reader, or multi-functional peripheral.

2. Description of the Related Art

Image reading apparatuses such as image scanners, image readers, and multi-functional peripherals have seen widespread adoption. In general, to use an image reading apparatus from a computer, a device driver and an application program dedicated to the image reading apparatus must be installed. Conventionally, a CD-ROM containing a device driver and application program must be inserted into a CD-ROM drive in order to install the device driver and application program in the hard disk drive, which is cumbersome.

Patent Reference 1 proposes a technique of causing a computer to recognize a printer as a CD-ROM drive and using an autorun function to install a printer driver and application program in the computer (Japanese Patent Laid-Open No. 2005-115427).

However, some computers limit installation of a device driver and application program for peripheral apparatuses. This limitation is often imposed as a security measure. For example, an operating system (OS) such as Microsoft Windows® permits only a user having administrator privileges to install device drivers. General users can install neither device drivers nor application programs. This situation is expected to occur frequently when a user uses a computer as a guest. Under this limitation, the invention described in Japanese Patent Laid-Open No. 2005-115427 is not effective.

SUMMARY OF THE INVENTION

The present invention provides a peripheral apparatus, image reading apparatus, and information processing system which allow use of a peripheral apparatus without installation, in an information processing apparatus, of a control program for controlling the peripheral apparatus, thereby improving the convenience of users who use the peripheral apparatus.

A peripheral apparatus may comprise a storage unit, a communication unit and a control unit. A storage unit stores a control program for controlling the peripheral apparatus connected to an information processing apparatus, and a management program for managing the control program. A communication unit transmits the control program from the storage unit to the information processing apparatus. A control unit controls an operation of the peripheral apparatus based on instruction information written in the storage unit upon executing the control program on the information processing apparatus. The management program controls a display object of the information processing apparatus by determining whether use of the control program in the information processing apparatus has ended.

More specifically, the management program manages whether the use of the control program has ended in response to a manipulation via a control object such as a control window for controlling the peripheral apparatus that is displayed on the information processing apparatus by executing the control program, and causes the information processing apparatus to control a display form of the control object of the peripheral apparatus serving as the display object of the information processing apparatus, based on a use state of the control program.

Further features of the present invention will become apparent from the following description of exemplary embodiments (with reference to the attached drawings).

DESCRIPTION OF THE EMBODIMENTS

Preferred embodiments of the present invention will be described below. Individual embodiments to be described below would help understand various concepts such as superordinate, intermediate, and subordinate concepts of the invention. The technical scope of the present invention is defined by the scope of the claims, and is not limited by the following embodiments.

First Embodiment

Figure 1:
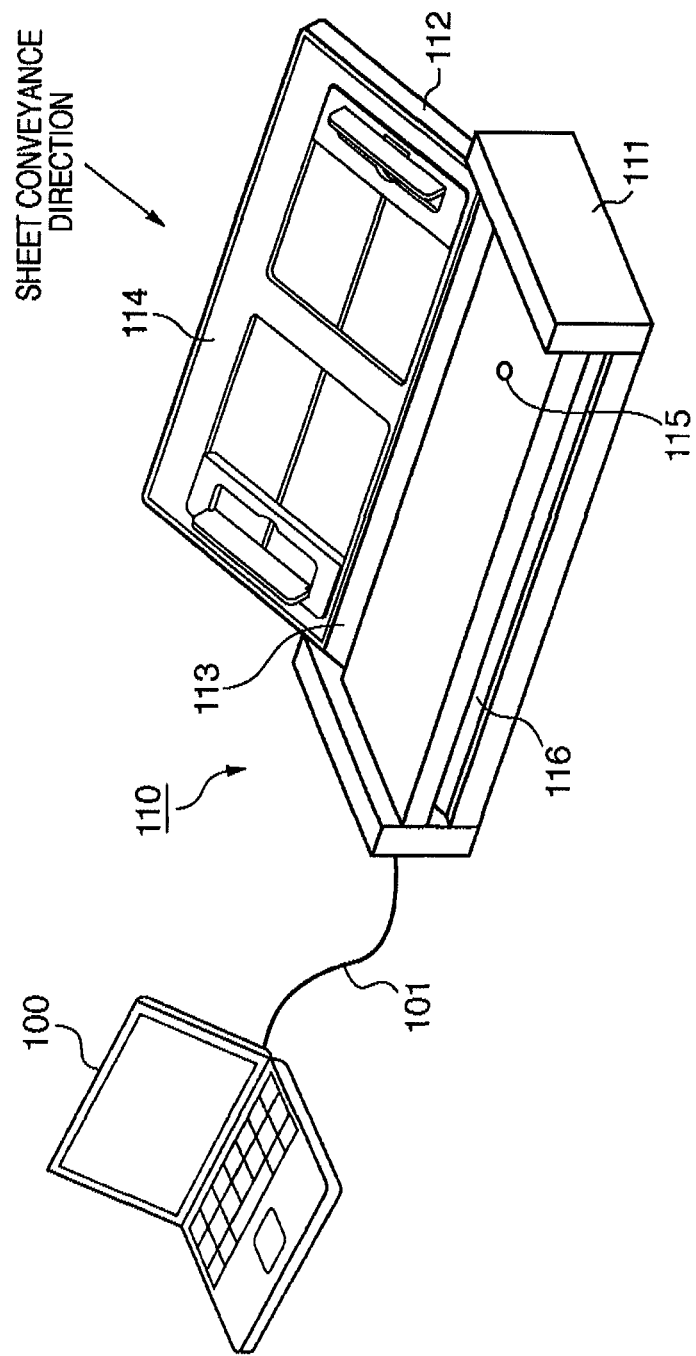
FIG. 1 is a perspective view showing a computer 100 exemplified as a general information processing apparatus, and a scanner apparatus serving as an image reading apparatus according to the first embodiment of the present invention.

FIG. 1 is a perspective view showing a computer 100 exemplified as a general information processing apparatus, and a scanner apparatus serving as an image reading apparatus according to the first embodiment of the present invention. As one feature of the present invention, an application program for using a peripheral apparatus is directly loaded from the peripheral apparatus into the memory of an information processing apparatus. The peripheral apparatus is not limited to an image reading apparatus or image forming apparatus, and the present invention is applicable to various kinds of peripheral apparatuses.

In a scanner apparatus 110, a paper feed tray 112 on which document sheets are stacked is supported by an apparatus main body 111 via hinges so as to be able to open/close the paper feed tray 112. When the paper feed tray 112 is closed, it covers a document feed port 113. When the paper feed tray 112 is open, document sheets can be stacked on a support surface 114. Document sheets stacked on the paper feed tray 112 are fed one by one. For example, a plurality of document sheets stacked on the paper feed tray 112 are separated and fed one by one from the bottom to a conveyance path by a feed roller and separation pad. The separate feeding of document sheets stacked on the paper feed tray 112 is executed in response to pressing an operation button 115 attached to the main body of the scanner apparatus 110. A document sheet fed to the conveyance path is conveyed to the downstream side by a conveyance roller pair. A reading sensor reads images on the obverse and reverse surfaces of the document sheet. After that, the conveyance roller pair discharges the document sheet from a discharge port 116. For example, in the embodiment, the computer 100 and scanner apparatus 110 are connected via a USB cable. The computer 100 supplies power to the scanner apparatus 110 via the USB cable. That is, the computer 100 supplies power to the scanner apparatus 110 using USB bus power.

The scanner apparatus 110 is connected to the computer 100 via a communication cable 101 such as a USB cable. The computer 100 serving as an information processing apparatus is, for example, a personal computer (PC).

In particular, the scanner apparatus 110 according to the first embodiment reads an image and saves the image data in its storage device while the computer recognizes the scanner apparatus 110 as a readable/writable disk drive. Even the computer 100 can access the storage device of the scanner apparatus 110 as an external storage device. The computer 100 can read out image data from the storage device of the scanner apparatus 110.

The computer 100 controls to write reading setting information, control commands, and the like for the scanner apparatus 110 in a control file stored in the storage device of the scanner apparatus 110. The scanner apparatus 110 extracts the reading setting information, control commands, and the like from the control file written in its storage device, and executes image reading.

In the first embodiment, a control program for controlling the scanner apparatus 110 is stored in the storage area of the scanner apparatus 110. Also, a management program for managing the control program is stored in the storage area of the scanner apparatus 110. When the computer 100 and scanner apparatus 110 are connected via the communication cable 101, the control program is sent from the storage area of the scanner apparatus 110 to the memory of the computer 100. By executing the control program received from the scanner apparatus 110, the computer 100 can control the scanner apparatus 110. According to the first embodiment, the user can use the scanner apparatus 110 without installing software such as the control program in the hard disk drive of the computer 100, which is very convenient for him. However, once the control program completely ends, it is impossible to display a control object such as the control window of the scanner apparatus 110 and control the scanner apparatus 110 via the control window unless the control program is loaded again from the scanner apparatus 110 to the memory of the computer 100. To reproduce a so-called autorun function, the control program in the memory of the computer 100 needs to be searched for and executed again using power-on/off of the scanner apparatus 110, physical removal and insertion of the communication cable 101, or a file system. The first embodiment reduces such user work load and improves user friendliness.

For this purpose, in addition to the control program, the management program for managing the control program is stored in the storage area of the scanner apparatus 110, as described above.

When, for example, an information processing apparatus (computer 100 in the first embodiment) executes the management program, the management program displays a control window for a peripheral apparatus (scanner apparatus 110 in the first embodiment) on the information processing apparatus. The management program controls the display object of the information processing apparatus by determining whether the use of the control program in the information processing apparatus has ended. More specifically, the management program manages, based on a manipulation by the user or the like, whether the use of the control program has ended. The display object is an object displayed on a desktop of the information processing apparatus such as a window, a popup dialogue, a button, a check box, a radio button, a taskbar, a task tray, an icon or the like. A user configures settings of the peripheral apparatus using the object to control the peripheral apparatus or recognize operation status of the peripheral apparatus. The management program may cause the information processing apparatus to control the display form of the control object such as a control window for controlling the peripheral apparatus based on the use state of the control program. Note that the management program may be transmitted from the peripheral apparatus to the information processing apparatus together with the control program and executed by the information processing apparatus. Alternatively, the management program may reside in the peripheral apparatus to remotely manage the control program executed by the information processing apparatus.

In the present invention, "the use of the control program has ended" includes at least the following two cases. In one case, the control program completely ends (this state will be called a complete end state), for example, the memory is released. In the other case, display of the peripheral apparatus control window based on execution of the control program is canceled (this state will be called an incomplete end state, temporary end state, stop state, or standby state) even while the control program itself does not end and remains running (e.g., resides in the memory and runs). The "use state of the control program" includes at least a state in which at least the control program has completely ended, and a state in which the peripheral apparatus control window is not displayed without completely ending the control program.

Figure 2:
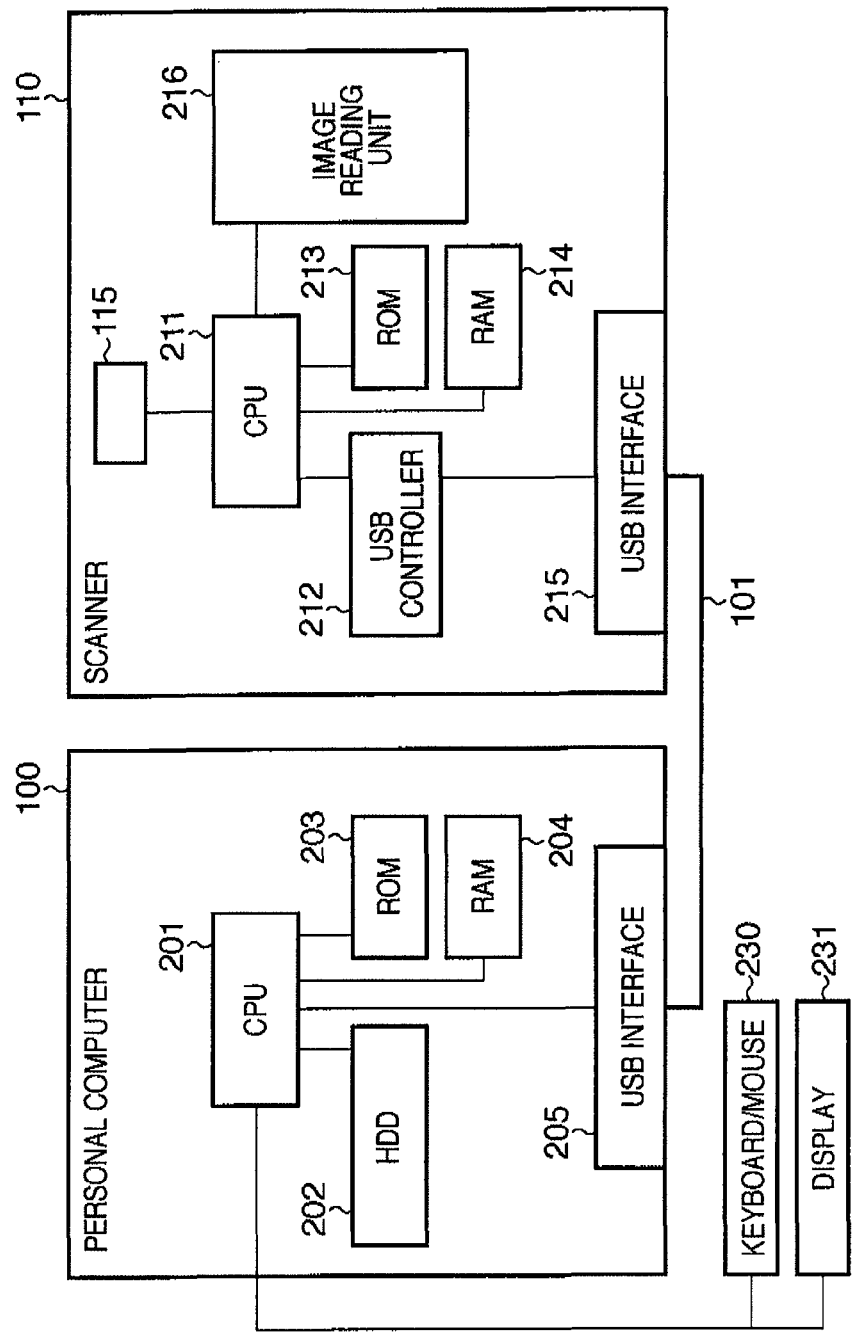
FIG. 2 is a hardware block diagram of a computer exemplified as a general personal computer, and a scanner.

The first embodiment will be described in detail. As shown in FIGS. 1 and 2, the operation button 115 attached to the main body of the scanner apparatus 110 is an instruction unit (scan execution button) which instructs the scanner apparatus 110 to start scanning. For example, in the embodiment, the computer 100 displays the control window of the scanner apparatus 110 by executing an application program (to be referred to as a capture application) for controlling the reading operation of the scanner apparatus 110, details of which will be described later.

In the first embodiment, when the user or the like performs a manipulation (presses a cancel button or close button) to end the control window of the scanner apparatus 110, the management program causes the computer 100 to switch the control window to the non-display state and stand by. If the user manipulates the operation button 115 of the scanner apparatus 110 in this state, the management program causes the computer 100 to switch the control window of the scanner apparatus 110 to the display state again in the computer 100. This can reduce the burden on the user when reproducing the autorun function. The operation button 115 is an example of an instruction unit which issues an instruction to return, from the non-display state to the display state, the control window of the scanner apparatus 110 that is displayed by executing the capture application.

FIG. 2 is a hardware block diagram of a computer exemplified as a personal computer, and a scanner according to the first embodiment. In FIG. 2, the computer 100 includes a CPU 201, ROM 203, RAM 204, hard disk drive 202, and USB interface 205. The USB interface 205 is an example of a communication unit which communicates with the information processing apparatus and is connected to the scanner apparatus 110 via the communication cable 101 that is a USB cable. A keyboard/mouse 230 and display 231 are connected to the CPU 201.

When the computer 100 is turned on, the CPU 201 serving as a control unit activates firmware from the ROM 203, and activates an operating system (OS) provided by Microsoft or the like from the hard disk drive 202. Necessary software programs such as an OS are loaded into the RAM 204. The hard disk drive 202 may be a memory type storage device such as a solid-state drive (SSD). It should be noted that CPU stands for central processing unit, CPU may be called as a control unit, a processing unit and/or a processor.

The scanner apparatus 110 includes a CPU 211, a ROM 213, a RAM 214, an image reading unit 216, a USB controller 212, a USB interface 215, and the operation button 115. When the scanner apparatus 110 is turned on, the CPU 211 serving as a control unit activates firmware from the ROM 213. In the first embodiment, the ROM 213 is a nonvolatile memory and allows the computer 100 to write information. The ROM 213 stores at least a capture application 319 and event monitoring module 318 to be described later. In the embodiment, the functions of the above-described control program and management program are distributed to and implemented by the capture application 319, event monitoring module 318, and CPU 211. The embodiment requires a function (monitoring function) of monitoring the use state of the control program, a function (display control function) of controlling the display form and display state of the user interface of the control program based on the monitoring result of the use state of the control program, and a function (peripheral apparatus control function) of controlling the peripheral apparatus. These three functions can be appropriately distributed between the control program and the management program. In general, the management program has the monitoring function and display control function, and the control program has the peripheral apparatus control function. In the first embodiment, the event monitoring module 318 includes the monitoring function, and the capture application 319 includes the display control function and peripheral apparatus control function. That is, the two functions of the management program are distributed and arranged in the event monitoring module 318 and capture application 319. Needless to say, the three functions may be implemented as three independent program modules. The event monitoring module 318 may have the monitoring function and display control function, and the capture application 319 may have the peripheral apparatus control function.

Both or either of the ROM 213 and RAM 214 is an example of a software storage unit which stores software to be executed by the information processing apparatus in order to use the image reading apparatus, and an example of a data storage unit which stores a control file and the like. Note that the ROM 213 and RAM 214 may be implemented by nonvolatile memories such as a flash memory and EEPROM. Especially when software is stored in the ROM 213 and can be upgraded, the ROM 213 is desirably formed from a nonvolatile memory. One nonvolatile memory may implement the ROM 213 and RAM 214. A buffer area may be reserved in the RAM 214 to temporarily store image data acquired by the image reading unit 216.

Figure 3:
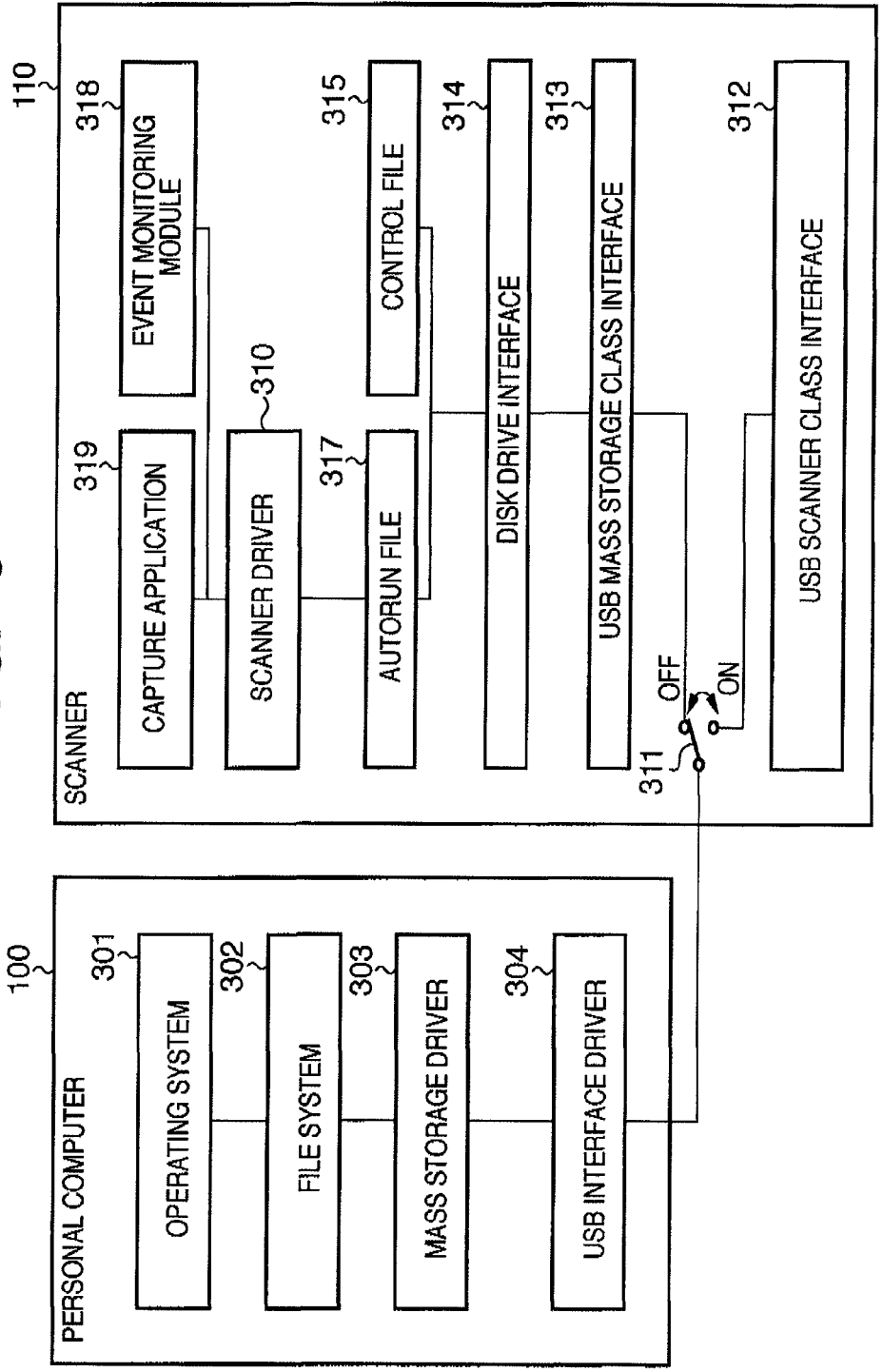
FIG. 3 is a software block diagram of the computer and scanner apparatus according to the first embodiment of the present invention.

FIG. 3 is a software block diagram of the computer and scanner apparatus according to the first embodiment of the present invention.

An operating system 301, file system 302, USB mass storage driver 303, and USB interface driver 304 are installed in the hard disk drive 202 of the computer 100. The operating system 301 is basic software for the computer 100. The file system 302 is software for storing a file in a storage device such as a hard disk drive. The USB mass storage driver 303 is software for controlling a mass storage such as a hard disk drive, CD-ROM, DVD-ROM, CD-R, DVD-R, or USB memory. The USB interface driver 304 is software for controlling a USB device connected to a USB interface. These software programs are generally provided as part of the OS.

The scanner apparatus 110 includes a scanner driver 310, the capture application 319, the event monitoring module 318, an autorun file 317, a control file 315, a USB disk drive interface 314, and a USB mass storage class interface 313. In the storage area of the scanner apparatus 110, not only the USB disk drive interface 314, but also the scanner driver 310, autorun file 317, event monitoring module 318, and capture application 319 are stored as subclasses of the USB mass storage class interface 313.

The scanner driver 310 is software for communication between the computer 100 and the scanner apparatus 110, but may be, for example, a scanner driver DLL (driver module). Every time an event occurs, the scanner driver 310 registers various kinds of event information in an event queue such as a control file. When the event monitoring module 318 inquires, of the scanner driver 310, event information of the scanner apparatus 110, the scanner driver 310 extracts the event information from the event queue and transfers it to the event monitoring module 318. In the first embodiment, the capture application 319 and scanner driver 310 are separate programs, but may be integrated into a capture application having the scanner driver function.

The autorun file 317 contains information for instructing the computer 100 to automatically execute the capture application 319. The autorun file 317 is, for example, autorun.inf. When the operating system 301 is Microsoft® Windows, "autorun.inf" is executed in response to inserting a USB memory into the USB disk drive interface 314. The autorun file 317 is accessed via the USB disk drive interface 314 and automatically runs.

In the first embodiment, when the computer 100 reads out and executes the autorun file 317, the capture application 319 and event monitoring module 318 are loaded into the RAM 204 of the computer 100 and activated. That is, the capture application 319 is a program which is transferred to the information processing apparatus via the communication unit, and is an example of an application program which is executed by the information processing apparatus. In the first embodiment, the capture application 319 and event monitoring module 318 may be sent from the ROM 213 of the scanner apparatus 110 to the RAM 204 of the computer 100. Alternatively, the capture application 319 and event monitoring module 318 may be temporarily moved from the ROM 213 of the scanner apparatus 110 to the RAM 214 of the scanner apparatus 110 and then sent from the RAM 214 of the scanner apparatus 110 to the RAM 204 of the computer 100.

The capture application 319 is software which is executed by the computer 100 to perform control for reading an image. The capture application 319 is software which is executed by the computer 100 to perform control for reading an image by the scanner apparatus 110.

The capture application 319 is effective in a PC having no device driver and a PC which limits installation of a device driver and application. This is because the capture application 319 is software capable of directly controlling the scanner apparatus 110 via the scanner driver 310 without installing a device driver or arbitrary capture application in the PC.

In the first embodiment, when the computer 100 executes the capture application, the capture application displays the control window of the scanner apparatus 110 on the screen of the computer 100. The control window allows a manipulation by the user and the like, and includes a window display end button (e.g., "cancel button" or "x button" which can be arbitrarily set) for ending the window display. In the first embodiment, the capture application has a function of detecting that the user has pressed the window display button on the control window. When the capture application detects that the user has pressed the window end button, it realizes some functions of the management program and causes the computer 100 to cancel display of the control window of the scanner apparatus 110, without shifting from the active state to the complete end state.

The event monitoring module 318 is a program which is transferred to the information processing apparatus via the communication unit, and is an example of a monitoring program which is executed by the information processing apparatus to monitor the operation of a peripheral apparatus.

The event monitoring module 318 is a program for periodically monitoring whether the user has pressed the operation button 115 of the scanner apparatus 110. The firmware of the scanner apparatus 110 writes, in the control file 315, information representing whether the user has pressed the operation button 115. In general, this information is updated when the user presses the operation button 115. By monitoring the information contained in the control file 315, the event monitoring module 318 determines whether the user has pressed the operation button 115.

Note that the control file 315 for controlling the scanner apparatus 110 is a file in which a control command and the like are written from the computer 100 which is executing the capture application 319. The control command corresponds to one which is written from the information processing apparatus when the information processing apparatus executes the application program transferred via the communication unit. Image data generated by the image reading unit 216 is written in the control file 315. The image data is an example of data generated by the peripheral apparatus in response to a control command. Note that the control file 315 may be prepared as a different file for each purpose.

The USB disk drive interface 314 is software for using a memory (e.g., flash memory or EEPROM) incorporated in the scanner apparatus 110 as a disk drive. The USB mass storage class interface 313 is software for using a memory as a USB mass storage via the USB disk drive interface 314.

The scanner apparatus 110 may include a USB scanner class interface 312 and switch 311 as options. The switch 311 is interlocked with a selector switch attached to the housing of the scanner apparatus 110. More specifically, when the selector switch is switched to the scanner mode, the switch 311 connects the USB scanner class interface 312 to the computer 100. The computer 100 recognizes the scanner apparatus 110 as a scanner as usual. To use the scanner apparatus 110 which operates in the scanner mode, the computer 100 requires a scanner driver.

If the selector switch is switched to the drive mode, the switch 311 connects the USB mass storage class interface 313 to the computer 100. The computer 100 recognizes the scanner apparatus 110 as an external storage device. The scanner apparatus 110 functions as an image reading apparatus via the capture application 319 and control file 315.

When a peripheral apparatus is connected to the USB interface 205 via the communication cable 101, the operating system 301 in the computer 100 accesses the interface of the peripheral apparatus to acquire interface class information and determine the type of peripheral apparatus.

Figure 4:
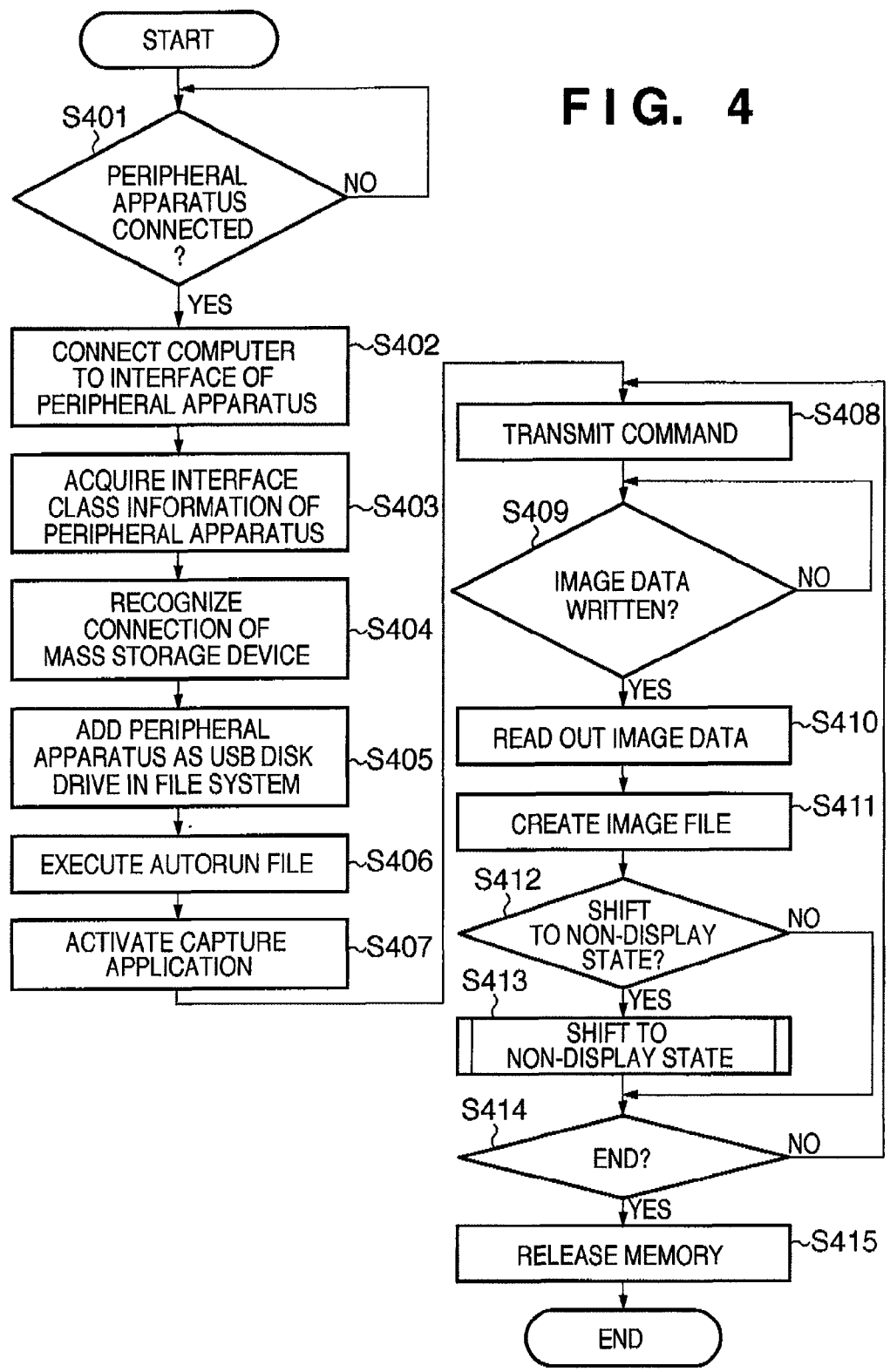
FIG. 4 is a flowchart of processing for reading an image using a scanner apparatus 110 by a capture application 319 from the computer 100.

FIG. 4 is a flowchart of processing of reading an image by the scanner apparatus 110 using the capture application 319 from the computer 100.

The CPU 201 of the computer 100 determines whether any peripheral apparatus has been connected to the USB interface 205 (S401). If the peripheral apparatus has been connected, the process advances to S402. The CPU 201 of the computer 100 is connected to the interface (USB mass storage class interface 313) of the connected peripheral apparatus via the USB interface driver 304 (S402). The CPU 201 of the computer 100 acquires interface class information from the USB mass storage class interface 313 of the scanner apparatus 110 (S403). Based on this information, the CPU 201 can recognize the type of connected peripheral apparatus (S404). In this case, it is turned out that the peripheral apparatus is a disk drive (USB mass storage device). The operating system 301 and CPU 201 add the connected scanner apparatus 110 as a disk drive to the file system (S405). More specifically, the operating system 301 forms, in a file folder associated with the file system 302, a table corresponding to the control file 315, autorun file 317, and capture application 319 which are saved in the scanner apparatus 110. The CPU 201 recognizes the control file 315 stored in the scanner apparatus 110 as a file on the disk drive to which a drive letter (e.g., "D") is assigned. In this way, the information processing apparatus recognizes the peripheral apparatus as an external storage device and uses it.

Figure 5:
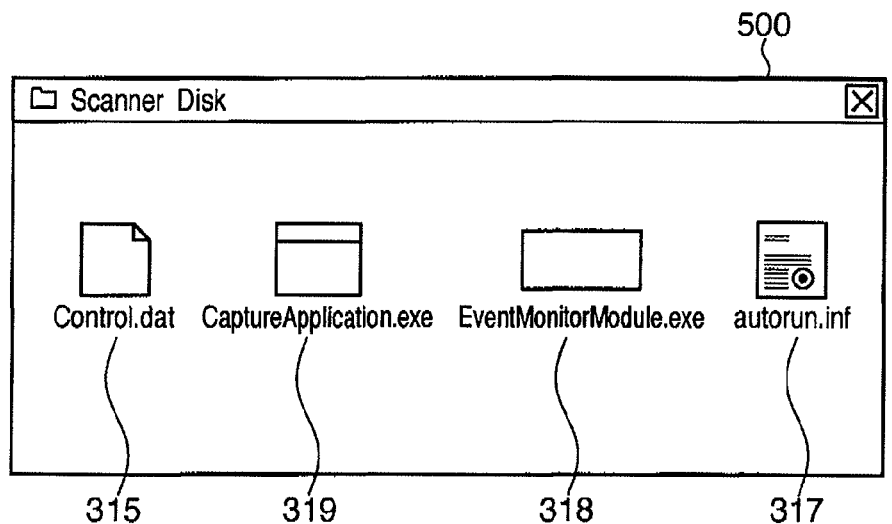
FIG. 5 is a view showing a state in which a disk drive (scanner apparatus 110) with a drive letter assigned is opened using file management software.

FIG. 5 is a view showing a state in which the disk drive (scanner apparatus 110) with a drive letter assigned is opened on file management software. A memory provided by the scanner apparatus 110 corresponds to a folder 500. The folder 500 can be opened using the keyboard/mouse 230 connected to the computer 100. The folder 500 is a readable/writable folder, and stores the control file 315 (file name: Control.dat), the capture application 319 (file name: CaptureApplication.exe), and the autorun file 317 (file name: Autorun.inf). The folder 500 also stores the event monitoring module 318 (file name: EventMonitorModule.exe).

The event monitoring module 318 is exemplified as an execution file in the exe format. However, the present invention is not limited to this, and the event monitoring module 318 may be loaded as a library file in the dll format into the capture application 319.

The operating system 301 (CPU 201) determines that a data USB memory has been inserted into the USB disk drive, loads the autorun file 317 from the scanner apparatus 110 into the RAM 204, and executes it (S406). The autorun file 317 describes activating the capture application 319 and event monitoring module 318. According to the autorun file 317, the operating system 301 (CPU 201) activates the capture application 319 and event monitoring module 318 (S407).

More specifically, the operating system 301 and CPU 201 load the capture application 319 and event monitoring module 318 from the scanner apparatus 110 into the RAM 204, and activate them. Since the CPU 201 recognizes the scanner apparatus 110 as an external storage device, it can directly activate the capture application 319 and event monitoring module 318.

The display 231 is connected to the computer 100 and can display a variety of user interfaces.

Figure 6:
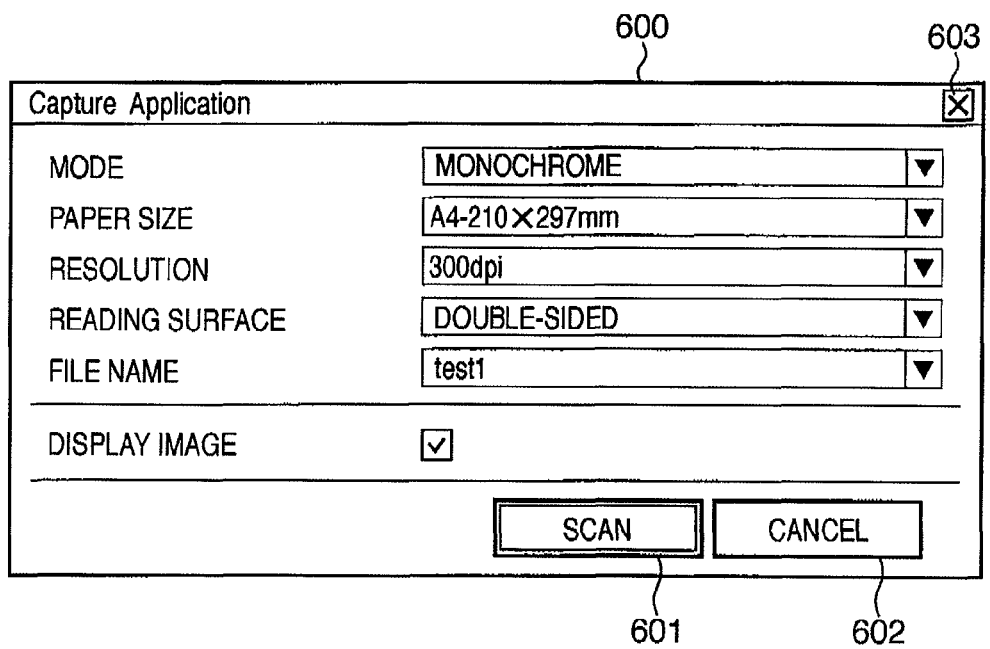
FIG. 6 is a view exemplifying a user interface 600 which is displayed when the capture application 319 is activated.

FIG. 6 is a view exemplifying a user interface 600 serving as the control window of the scanner apparatus 110 that is displayed when the capture application 319 is activated. Pull-down menus for making scan settings, a text box for inputting a file name, a scan button 601, a cancel button 602, an end button 603, and the like are arranged in the user interface 600. The scan button 601 is used to issue an instruction to start image reading. The cancel button 602 is used to issue an instruction to switch the user interface 600 to the non-display state while the capture application 319 remains resident in the RAM. The end button 603 is used to issue an instruction to release the RAM from the capture application 319 and completely end the capture application 319.

When the user interface of the capture application 319 as shown in FIG. 6 is displayed, the user makes scan settings by manipulating the keyboard/mouse 230. For example, the user uses the keyboard/mouse 230 to select the reading mode (monochrome in the embodiment), paper size (A4 in the embodiment), resolution (300 dpi in the embodiment), and reading surface (double-sided in the embodiment). Further, the user manipulates the keyboard/mouse 230 to input the file name (test1 in the embodiment) of an image file for saving a read image. Finally, the user clicks the scan button 601 with the keyboard/mouse 230.

When the user clicks the scan button 601 with the keyboard/mouse 230, the capture application 319 (CPU 201) accepts the scan settings and writes them in the control file 315 in the scanner apparatus 110. In addition, the CPU 201 controls to write even scan start command data in the control file 315 (S408).

The CPU 211 of the scanner apparatus 110 monitors the control file 315. If the CPU 211 detects that the scan settings and scan start command data have been written in the control file 315, it reads the control file 315, controls the image reading unit 216 based on the scan settings written in the control file 315, and starts scanning. After the start of scanning, the scanner apparatus 110 writes the image read by the image reading unit 216 in the control file 315. Status data and the like corresponding to the control command are also written in the control file 315. The control file may be identical to or different from a control file which allows scan settings.

In the scanner apparatus 110, a document sensor (not shown) may be attached to the document feed port 113. If the document sensor determines that no document is set, the operation in S408 is not executed. More specifically, when the user presses the operation button 115 while the scanner apparatus 110 and computer 100 are connected to each other, the capture application 319 is activated. At this time, if the document sensor determines that no document is set, the start of scanning is inhibited. If the user presses the operation button 115 again, the scan operation starts. If the document is still absent, a document absence error may be displayed via the capture application 319.

The CPU 201 (capture application 319) of the computer 100 monitors whether image data has been written in the control file 315 (S409). If the CPU 201 (capture application 319) detects that image data has been written in the control file 315, it reads out the image data from the control file 315 (S410).

The capture application 319 generates an image file having the designated file name (test1 in the embodiment) from the readout image data, and saves it in the hard disk drive 202 or the like (S411).

In this manner, according to the first embodiment, the image reading apparatus can be used without installing a device driver or software in the computer. In this case, the information processing apparatus recognizes the image reading apparatus as an external storage device. An image file is written in the external storage device, and read out by the information processing apparatus. This can be achieved because the operating system (OS) which controls the information processing apparatus has not the device driver of the image reading apparatus, but the device driver of the external storage device. By paying attention to this fact, the present invention can implement image reading processing while the information processing apparatus keeps recognizing the image reading apparatus as an external storage device. This can save the user from installing the device driver and application program in the information processing apparatus. Even a user having no administrator right can execute image reading. The user need not prepare the device driver and application program. The user need not carry a CD-ROM which stores them, or may lose it. A manufacturer need not pack the CD-ROM with the product package, which is advantageous in terms of the manufacturing cost.

Figure 7:
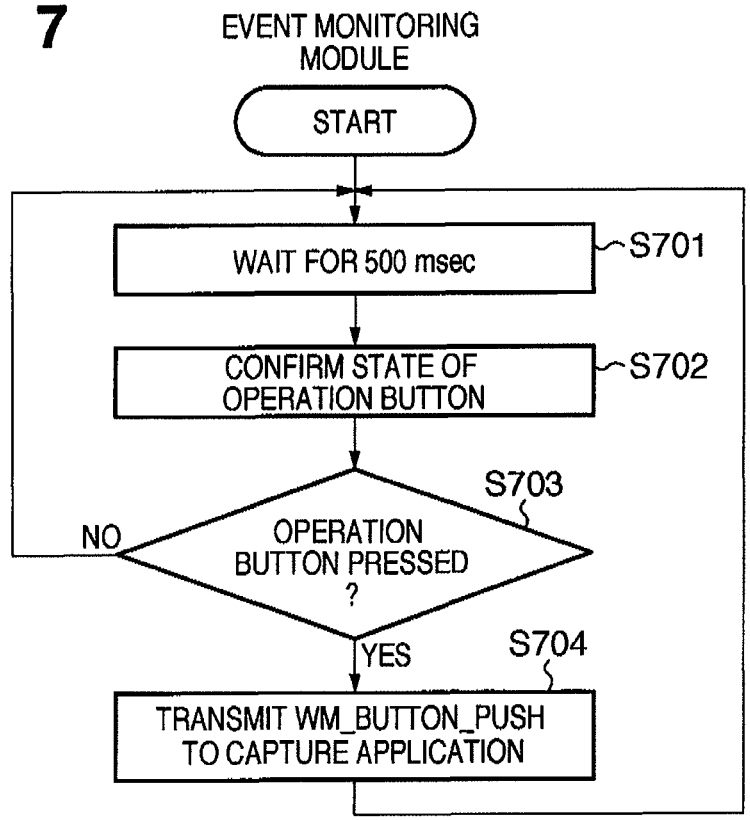
FIG. 7 is a flowchart for explaining the operation of an event monitoring module 318.
Figure 8:
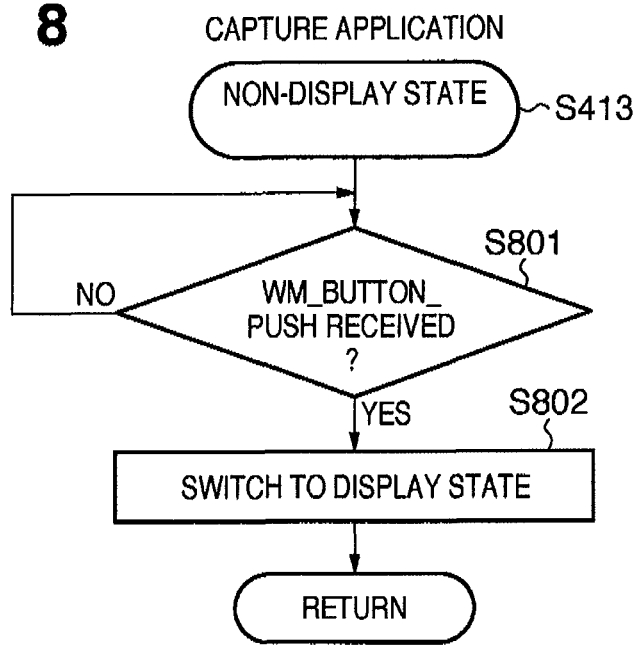
FIG. 8 is a flowchart showing the operation of the capture application which stands by in the non-display state.

Upon completion of saving the image file, the CPU 201 (capture application 319) of the computer 100 determines whether it is instructed to shift the capture application 319 from the display state to the non-display state (S412). For example, if the CPU 201 (capture application 319) detects that the user has pressed the cancel button 602, it determines that a shift to the non-display state is designated. If a shift to the non-display state is designated, the process advances to S413. The capture application 319 causes the CPU 201 to switch the user interface 600 to the non-display state (S413). That is, the capture application 319 realizes some functions of the management program. The application program is switched to the non-display state after the end of using the peripheral apparatus. The capture application 319 keeps running in the background, and waits for an instruction to restart or shift to the display state (FIGS. 7 and 8). As will be described later, if the capture application 319 returns from the non-display state to the display state, the process advances to S414, and the CPU 201 determines whether the user has pressed the end button 603.

A shift of the capture application 319 to the non-display state is a kind of event. The event monitoring module 318 detects that the capture application 319 has shifted to the non-display state.

The non-display state takes several forms. For example, the capture application 319 is minimized and displayed on the task bar, displayed as an icon on the task tray, or is not displayed at all on the desktop.

The event monitoring module 318 is notified of an event regarding the execution state of the capture application 319 as follows. For example, when the user designates the end of the capture application 319 by pressing the cancel button, end button, or the like on the user interface, or pressing "Alt+F4", "Esc", or the like on the computer 100, a message (unique message such as WM_APPLICATION_END) is transmitted to the event monitoring module 318 before releasing the memory. As another method, the event monitoring module may confirm the end state of the capture application 319 for a running application using the operating system of the computer 100.

If a shift to the non-display state is not designated, the process advances to S414. The CPU 201 (capture application 319) determines whether the user has pressed the end button 603 (S414). If the user has not pressed the end button 603, the process returns to S408, and the CPU 201 keeps the display state of the capture application 319. If the CPU 201 (capture application 319) detects that the user has pressed the end button 603, the process shifts to S415. The CPU 201 erases the capture application 319 from the RAM 204 to release the RAM 204 (S415).

FIG. 7 is a flowchart for explaining the operation of the event monitoring module 318. In accordance with the event monitoring module 318, the CPU 201 confirms the state of the operation button 115 of the scanner apparatus 110 (S702) in every predetermined period (e.g., 500 msec) (S701). The CPU 211 of the scanner apparatus 110 monitors pressing of the operation button 115. If the CPU 211 detects the pressing, it writes, in the control file 315, instruction information indicating that the user has pressed the operation button 115. The pressing of the operation button 115 is a manipulation which means the restart of the capture application 319 or a shift to the display state. The CPU 211 of the scanner apparatus 110 is an example of a writing unit which writes instruction information in the data storage unit when the instruction unit issues an instruction.

The CPU 201 of the computer 100 reads out the instruction information from the control file 315 in accordance with the event monitoring module 318, and determines, based on the instruction information, whether the user has pressed the operation button (S703). The CPU 201 is an example of a determination unit which determines whether instruction information has been written in the data storage unit. If the CPU 201 determines that the user has pressed the operation button 115, the CPU 211 transmits, to the capture application 319, a WM_BUTTON_PUSH message which means that the user has pressed the operation button 115 (S704). The WM_BUTTON_PUSH message is substantially information issued to designate the restart of the capture application 319 or a shift to the display state. The CPU 201 is an example of a display switching unit which switches the application program from the non-display state to the display state upon writing instruction information.

FIG. 8 is a flowchart showing the operation of the capture application which stands by in the non-display state. This flowchart shows S413 as a subroutine.

According to the capture application 319, the CPU 201 determines whether it has received the WM_BUTTON_PUSH message (S801). If the event monitoring module 318 transmits the WM_BUTTON_PUSH message, the process advances to S802. The CPU 201 switches the user interface 600 from the non-display state to the display state according to the capture application 319 (S802). This can greatly improve user friendliness. For example, the user can execute image reading using the capture application 319 again.

In the above description, the event monitoring module 318 monitors the operation button 115 via the control file 315. However, the capture application 319 may incorporate the event monitoring module 318. In this case, the capture application 319 monitors the operation button 115 via the control file 315. In either case, the present invention is not limited to the above-described embodiment as long as software programs such as applications, the CPU of a peripheral apparatus, that of an information processing apparatus, and the like appropriately cooperate with each other to realize the functions of the control program and management program.

In the first embodiment, the capture application 319 starts scanning. However, the scanner apparatus 110 may start scanning when the CPU 211 detects that the user has pressed the operation button 115 attached to the scanner apparatus 110. The capture application 319 monitors pressing of the operation button 115 via the control file 315. In this case, the CPU 211 writes, in the control file 315, information indicating that the user has pressed the operation button 115.

Note that the capture application 319 (CPU 201) may detect that image data has been stored in the control file 315, and determine that scanning has started.

Second Embodiment

In the first embodiment, when the user performs a manipulation to end the use of the control program (capture application) via the control window (user interface) of the peripheral apparatus (scanner apparatus), display of the control window is canceled, and then the information processing apparatus (computer) functions to switch from the non-display state to the display state while substantially keeping the control program running.

The second embodiment will explain the restart of a capture application 319 from the complete end state. As described above, when the user manipulates an end button 603, the capture application 319 is erased from a RAM 204. To restart the capture application 319, it needs to be loaded again into the RAM 204.

In the second embodiment, an event monitoring module 318 resides in the RAM 204 even after the capture application 319 completely ends. If the event monitoring module 318 detects that the user has manipulated an operation button 115, it activates the capture application 319. Assume that the event monitoring module 318 knows full path information of the capture application 319. In this case, a CPU 201 functions as a reloading unit which, if an application program has ended, reloads the application program stored in a software storage unit into the memory of the information processing apparatus.

If the event monitoring module 318 does not know the full path of the capture application 319, it is possible to temporarily cancel the (software) connection between a scanner apparatus 110 and a computer 100, and then reconnect them without physically removing and inserting a cable between the scanner apparatus 110 and the computer 100. In this case, the autorun function of the computer 100 acts to restart the capture application 319. Control accompanying the restart of the capture application 319 can also be achieved by temporarily stopping power supply from the computer 100 and then supplying power. This can greatly improve user friendliness.

Figure 9:
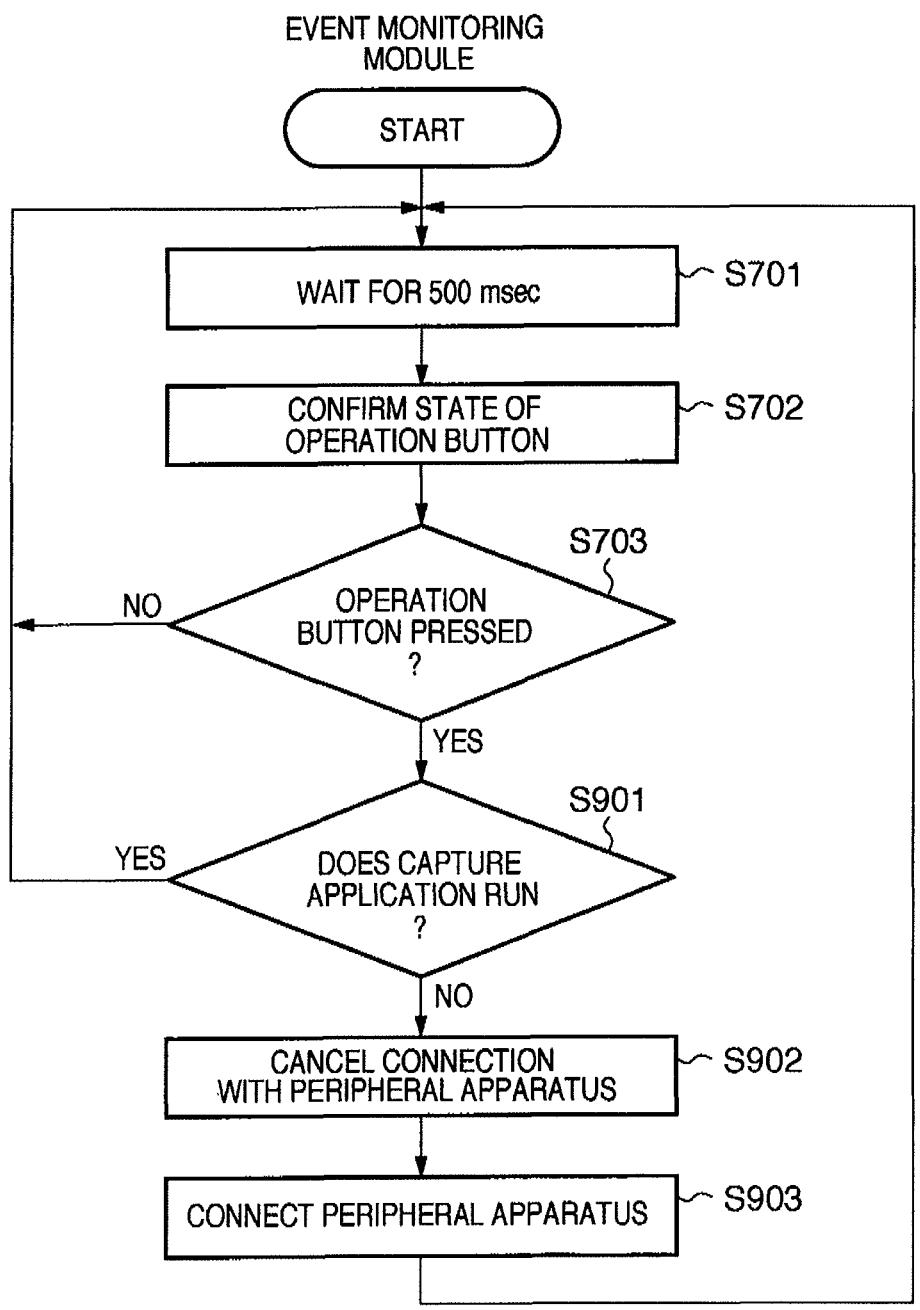
FIG. 9 is a flowchart showing the operation of the event monitoring module 318.

FIG. 9 is a flowchart showing the operation of the event monitoring module 318. The same reference numerals as those described above denote the same steps for descriptive convenience. After executing S701 to S703 described above, the process advances to S901.

In accordance with the event monitoring module 318, the CPU 201 confirms whether the capture application 319 runs (S901). Confirming whether the capture application 319 runs is equivalent to processing of determining whether the application program has ended. Hence, the CPU 201 functions as a determination unit which determines whether the application program has ended. If the capture application 319 has been loaded into the RAM 204, the process returns to S701. If the capture application 319 is not displayed, the CPU 201 executes S704 and then returns to S701.

If the capture application 319 has not been loaded into the RAM 204, the process advances to S902. The CPU 201 cancels the connection with the scanner apparatus 110 according to the event monitoring module 318 (S902). For example, the CPU 201 controls a USB interface 205 to set both the D+ and D− signals of the USB bus to 0, thereby disconnecting the scanner apparatus 110 from the computer 100. Note that the USB cable need neither be inserted nor removed. The CPU 201 shifts the USB interface 205 to a USB bus reset state, and the scanner apparatus 110 shifts to the connection state (S903). In response to this, S401 to S407 shown in FIG. 4 are executed to activate the capture application 319. In this way, the CPU 201 functions as a reconnection control unit which temporarily cancels the connection between the communication unit and the information processing apparatus and then reconnects them if the application program has ended.

In the second embodiment, when the user presses the operation button 115, the connection (disconnection and reconnection) between the peripheral apparatus and the information processing apparatus is simulated. The capture application 319 or the like is reloaded from the scanner apparatus 110 to the computer 100. The computer 100 can restart the capture application 319. This can greatly improve user friendliness.

The second embodiment has been described from the viewpoint of the computer 100. However, when viewed from the scanner apparatus 110, the restart of the capture application 319 is equivalent to retransmission of the capture application 319 from the scanner apparatus 110. Even if the user has completely ended the use of the control program, the control program remains stored in the storage area of the scanner apparatus 110. By retransmitting the control program from the storage area of the scanner apparatus 110 to the computer 100, the scanner apparatus 110 can be controlled again. The second embodiment will be explained from the viewpoint of retransmission of the control program.

The control program is retransmitted in response to the manipulation of the scanner apparatus 110 while the computer 100 and scanner apparatus 110 are connected. The manipulation of the scanner apparatus 110 is, for example, manipulating a building member of the scanner apparatus 110.

An example of the manipulation is pressing of the operation button 115 attached to the main body of the scanner apparatus 110. Note that the retransmission of the control program is not limited to the above case, and may be executed based on the detection result of an opening/closing sensor which detects opening/closing of a paper feed tray 112, or the document detection result of a document sensor arranged near the paper feed port. Alternatively, a dedicated retransmission button different from the operation button 115 may be separately attached to an apparatus main body 111. If the scanner apparatus 110 detects that the user has pressed the operation button 115, it retransmits the control program to the computer 100. In any case, when a CPU 211 of the scanner apparatus 110 detects that a predetermined manipulation has been done in the scanner apparatus 110, it retransmits the control program.

The control program may be retransmitted to the computer 100 when the CPU 211 serving as the control unit of the scanner apparatus 110 temporarily cancels the software connection between the computer 100 and the scanner apparatus 110 and then reconnects them in response to the manipulation of the scanner apparatus 110. Also in this case, the scanner apparatus 110 is recognized as a storage device, and the control program stored in the storage device is retransmitted by the autorun function. That is, the CPU 201 of the computer 100 loads the control program from the scanner apparatus 110 to the RAM 204, activating the control program. In the second embodiment, power supplied to the scanner apparatus 110 is USB bus power from the computer 100. For example, the control unit of the scanner apparatus 110 may temporarily stop power supply from the computer 100 to the scanner apparatus 110, then supply power again, and retransmit the control program to the computer 100. In any of the above-described cases, the user need not do cumbersome work such as removal and insertion of a physical connection cable between the computer 100 and the scanner apparatus 110. The control program can be reliably retransmitted and reactivated in the computer 100, which improves user friendliness.

When retransmitting the control program, it is preferably determined whether the computer 100 has completely ended the use of the control program. For example, the control unit of the scanner apparatus 110 preferably confirms whether end information indicating that the computer 100 has completely ended the use of the control program has been written in a storage area (e.g., control file in practice). That is, the control unit of the scanner apparatus 110 confirms the end information of the control program in advance by referring to the storage area. If the control unit of the scanner apparatus 110 confirms the end information of the control program, it retransmits the control program. This can improve user friendliness while preventing double activation of the control program.

When the control program detects that the user has ended the use of it, it may write the end information in the storage area of the scanner apparatus 110 before erasing the control program from the memory (RAM 204). Further, a management program for managing the end state of the use of the control program may separately reside in the scanner apparatus 110. Alternatively, the management program may be transmitted to the computer 100 together with the control program and executed. It suffices to save the end information of the control program in, for example, the storage area of the scanner apparatus 110 so that the control unit can confirm it. For example, the end information of the control program may be written in a control file (to be described later) stored in the RAM of the scanner apparatus 110 or the like, and the control unit may check it in real time or periodically. The end information may be managed in a dedicated file other than the control file. In any case, it suffices to notify the control unit of the scanner apparatus 110 of the end information of the control program. The end information of the control program may be confirmed when, after, or before the scanner apparatus 110 is manipulated. At any rate, it is preferable to confirm the end information of the control program before retransmitting the control program. The management program may monitor the use state of the control program, and if it detects the end of the use of the control program, write the end information of the control program in the storage area of the scanner apparatus 110. In any case, the control unit can confirm in advance the end information of the control program that is written in the storage area of the scanner apparatus 110 and retransmit the control program. This can effectively prevent a problem that the computer 100 performs double activation of the control program.

When the control program is retransmitted in this fashion, the CPU 201 of the computer 100 can execute the received control program again to display again a control window for controlling the operation of the scanner apparatus 110. In other words, the computer 100 can control again the scanner apparatus 110 based on the control window.

In the second embodiment, it is also possible to, after executing the control program, manage it by the management program even before retransmission, and execute the control program, thereby controlling the display state of the control window of the scanner apparatus 110 on the computer 100.

Retransmission and reactivation of the capture application 319 serving as an example of the control program in the second embodiment will be exemplified in detail.

More specifically, reactivation after completely ending the capture application 319 will be explained. As described above, when the user manipulates the end button 603, the CPU 201 erases the capture application 319 from the RAM 204. To reactivate the capture application 319, it needs to be retransmitted to the RAM 204 of the computer 100.

The capture application 319 is retransmitted based on the use state of the capture application 319 by the computer 100 serving as an example of the information processing apparatus.

The "use state of the of the capture application 319" includes at least a state in which at least the capture application 319 has completely ended, and a state in which the control window of the scanner apparatus 110 is not displayed without completely ending the control program. The capture application 319 is retransmitted in the state in which the capture application 319 has completely ended, that is, when the capture application 319 is erased from the RAM 204.

The capture application 319 is retransmitted in accordance with the manipulation of the scanner apparatus 110 while the computer 100 and scanner apparatus 110 are connected. For example, the manipulation of the scanner apparatus 110 includes manipulating a building member (e.g., the operation button 115, the opening/closing sensor of the paper feed tray 112, or the document sensor) of the scanner apparatus 110. The CPU 211 serving as the control unit of the scanner apparatus 110 retransmits the capture application 319 in synchronism with the manipulation of the scanner apparatus 110.

The capture application 319 may be retransmitted to the computer 100 when the CPU 211 of the scanner apparatus 110 temporarily cancels the software connection between the computer 100 and the scanner apparatus 110 and then reconnects them in response to the manipulation of the scanner apparatus 110.

However, the present invention is not limited to the foregoing examples. In the second embodiment, power supplied to the scanner apparatus 110 is USB bus power from the computer 100. For example, the CPU 211 of the scanner apparatus 110 may temporarily stop power supply from the computer 100 to the scanner apparatus 110, then supply power again, and retransmit the capture application 319 to the computer 100.

In any of the above-described cases, the user need not do cumbersome work such as removal and insertion of a physical connection cable between the computer 100 and the scanner apparatus 110. The capture application 319 can be reliably retransmitted to reactivate the control program in the computer 100. This can improve user friendliness, and simplify work necessary to drive the scanner apparatus 110 again by the user.

When retransmitting the capture application 319, it is preferably determined whether the computer 100 has completely ended the use of the capture application 319. For example, the CPU 211 of the scanner apparatus 110 preferably confirms whether end information indicating that the computer 100 has completely ended the use of the capture application 319 has been written in a storage area (e.g., control file in practice).

That is, the CPU 211 of the scanner apparatus 110 confirms the end information of the capture application 319 in advance by referring to the storage area. If the CPU 211 of the scanner apparatus 110 confirms the end information of the capture application 319, it retransmits the capture application 319. This can improve user friendliness while preventing double activation of the capture application 319.

It is also possible that the capture application 319 itself can detect the end of it by the user, and the end information of the capture application 319 is written in the storage area of the scanner apparatus 110 before erasing the capture application 319 from the memory.

Further, a management program (e.g., event monitoring module 318) for managing the end state of the use of the capture application 319 may separately reside in the scanner apparatus 110. Alternatively, the management program may be transmitted to the computer 100 together with the capture application 319 and executed.

The management program may monitor the use end state of the capture application 319, and if it detects the end of the use of the capture application 319, write the end information of the capture application 319 in the storage area of the scanner apparatus 110.

In any case, the control unit can confirm in advance the end information of the capture application 319 that is written in the storage area of the scanner apparatus 110, and retransmit the capture application 319. This can effectively prevent a problem that the computer 100 performs double activation of the capture application 319.

An application of the event monitoring module 318 as the management program for managing the end state of the use of the capture application 319 will be described. For example, even if the user has completely ended the use of the capture application 319, the event monitoring module 318 remains resident in the RAM 204. If the event monitoring module 318 detects the manipulation of the operation button 115, the capture application 319 is retransmitted and activated. In this case, the CPU 211 of the scanner apparatus 110 functions as a reloading unit which, if an application program has ended, reloads the application program stored in a software storage unit into the memory of the information processing apparatus.

In this case, the CPU 211 of the scanner apparatus 110 can temporarily cancel the (software) connection between the scanner apparatus 110 and the computer 100, and reconnect them. In response to this, the autorun function of the computer 100 acts to reactivate the capture application 319 without physically removing and inserting a cable between the scanner apparatus 110 and the computer 100. Control accompanying the reactivation of the capture application 319 can also be achieved by temporarily stopping power supply from the computer 100 and then supplying power. This can improve user friendliness.

Figure 10:
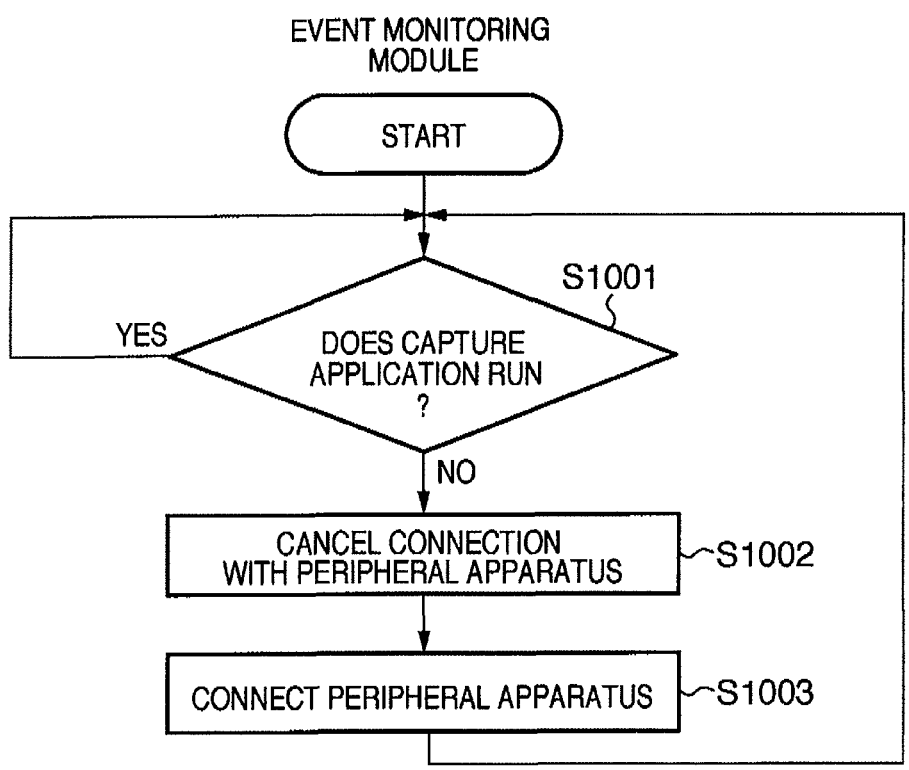
FIG. 10 is a flowchart showing another operation of the event monitoring module.

FIG. 10 is a flowchart showing the operation of the event monitoring module 318.

In accordance with the event monitoring module 318, the CPU 211 of the scanner apparatus 110 confirms whether the capture application 319 runs (S1001). Confirming whether the capture application 319 runs is equivalent to processing of determining whether the application program has ended. The CPU 211 of the scanner apparatus 110 functions as a determination unit which determines whether the application program has ended. If the CPU 211 of the scanner apparatus 110 determines that the use of the capture application 319 has completely ended, the process advances to S1002. At this time, the CPU 211 of the scanner apparatus 110 confirms that the end information of the capture application 319 has been written in the storage area (e.g., control file) of the scanner apparatus 110. If the CPU 211 of the scanner apparatus 110 detects that the user has manipulated the scanner apparatus 110 (e.g., he has pressed the operation button 115), it cancels the connection between the computer 100 and the scanner apparatus 110 in accordance with the determination by the event monitoring module 318 (S1002). For example, the CPU 211 of the scanner apparatus 110 controls a USB interface 215 to set both the D+ and D− signals of the USB bus to 0, thereby disconnecting the scanner apparatus 110 from the computer 100. Note that the USB cable need neither be inserted nor removed.

The CPU 211 shifts the USB interface 215 to a USB bus reset state, and the scanner apparatus 110 shifts to the connection state (S1003). In response to this, S401 to S407 shown in FIG. 4 are executed to retransmit and activate the capture application 319. In this way, the CPU 211 of the scanner apparatus 110 functions as a reconnection control unit which temporarily cancels the connection between the communication unit and the information processing apparatus and then reconnects them if the application program has ended.

In the second embodiment, when the user presses the operation button 115 or the like, the connection (disconnection and reconnection) between the peripheral apparatus and the information processing apparatus is simulated. The capture application 319 or the like is reloaded from the scanner apparatus 110 to the computer 100. The computer 100 can reactivate the capture application 319. This can greatly improve user friendliness. In the second embodiment, the CPU 211 of the scanner apparatus 110 controls retransmission of the capture application 319. Instead, the same control may be performed by the CPU 201 of the computer 100 serving as an information processing apparatus, or by the scanner apparatus 110 (CPU 211) and the computer 100 (CPU 201).

If it is not preferable in terms of security to execute the scan function, execution of the scan function can be limited by setting OFF the autorun function of the computer 100. In general, Microsoft Windows® allows easily changing the setting of the autorun function by rewriting the registry setting.

Third Embodiment

In the third embodiment, the document conveyance mechanism of a scanner apparatus 110 will be explained.

The scanner apparatus 110 includes a roller for conveying a document. This means that the scanner apparatus 110 includes a kind of rotation member driving device. As the driving motor of the rotation member driving device of this type, the scanner apparatus 110 sometimes uses a servomotor. In this case, an optical sensor generally reads a slit encoder which rotates together with the rotating shaft of the motor. Based on the read information, a control unit controls driving of the motor, and detects a sheet conveyance position and the like.

The slit encoder has a plurality of small holes (slits) which are formed in the rotational direction by etching or the like. A light-emitting element and light-receiving element are arranged to sandwich the slits. Light emitted by the light-emitting element passes through the slits and is received by the light-receiving element. However, if the light is cut off by a light-shielding portion (photointerrupter) between the slits, it does not reach the light-receiving element. The period of a signal output from the light-receiving element is therefore proportional to the rotational speed of the rotating shaft of the motor. It is important to reliably transmit light through the slits, in order to maintain the detection precision of the rotational speed. In some cases, a chip, dust, or the like which enters from the rotation member, the outside, or the like may attach to the slit and clog it. In this case, light emitted by the light-emitting element is cut off by the chip or dust. This may generate a detection error when the control unit detects a sheet conveyance position and the like based on information read by the optical sensor.

To solve this problem, Japanese Patent Laid-Open No. 5-296789 discloses a motor encoder in which a slit plate is covered with a case.

However, the motor unit itself becomes large due to the case in the motor encoder in which the slit plate is covered with the case, like Japanese Patent Laid-Open No. 5-296789. This makes it difficult to effectively use the space, and obstructs downsizing the rotation member driving device. Attaching the case to the motor requires parts and the like for the attachment, in addition to the case. It becomes hard to reduce the weight and cost.

Under the circumstance, the third embodiment proposes a rotation member driving device, sheet conveyance device, and image processing apparatus capable of downsizing the apparatus while ensuring dust proof of a plate to be read, and decreasing the number of parts to reduce the weight and cost.

The basic concept of the third embodiment will be explained. The rotation member driving device includes a rotation member driving unit having a driving unit which drives a rotation member and a plate to be read which is arranged in the driving unit and used to detect rotation information of the rotation member driven by the driving unit, and a device main body housing which stores the rotation member driving unit. Members which form the device main body housing define a dustproof space as a space which surrounds at least the plate to be read. It is also possible to divide the device main body housing into a plurality of separate members, and define the dustproof space by the separate member which separates the rotation member and the rotation member driving unit, and the separate member which separates the rotation member driving unit and the outside. The rotation member driving unit may be arranged at the corner of the device main body housing, and the members which define the dustproof space may include members which form the inner wall surfaces of the device main body housing. The plate to be read may be an encoder having a plurality of slits formed in the rotational direction. The sheet conveyance device includes a conveyance unit which conveys a sheet by a rotation member, a device main body housing which stores a rotation member driving unit having a driving unit that drives a rotation member and a plate to be read that is arranged in the driving unit and used to detect rotation information of the rotation member driven by the driving unit, and a dustproof space which is defined as a space that surrounds at least the plate to be read, by members that form the device main body housing. The image processing apparatus includes the sheet conveyance device, and a processing unit which performs predetermined processing for a sheet conveyed by the sheet conveyance device.

The third embodiment can downsize the apparatus while ensuring dust proof of a plate to be read, and decrease the number of parts to reduce the weight and cost.

Figure 11:
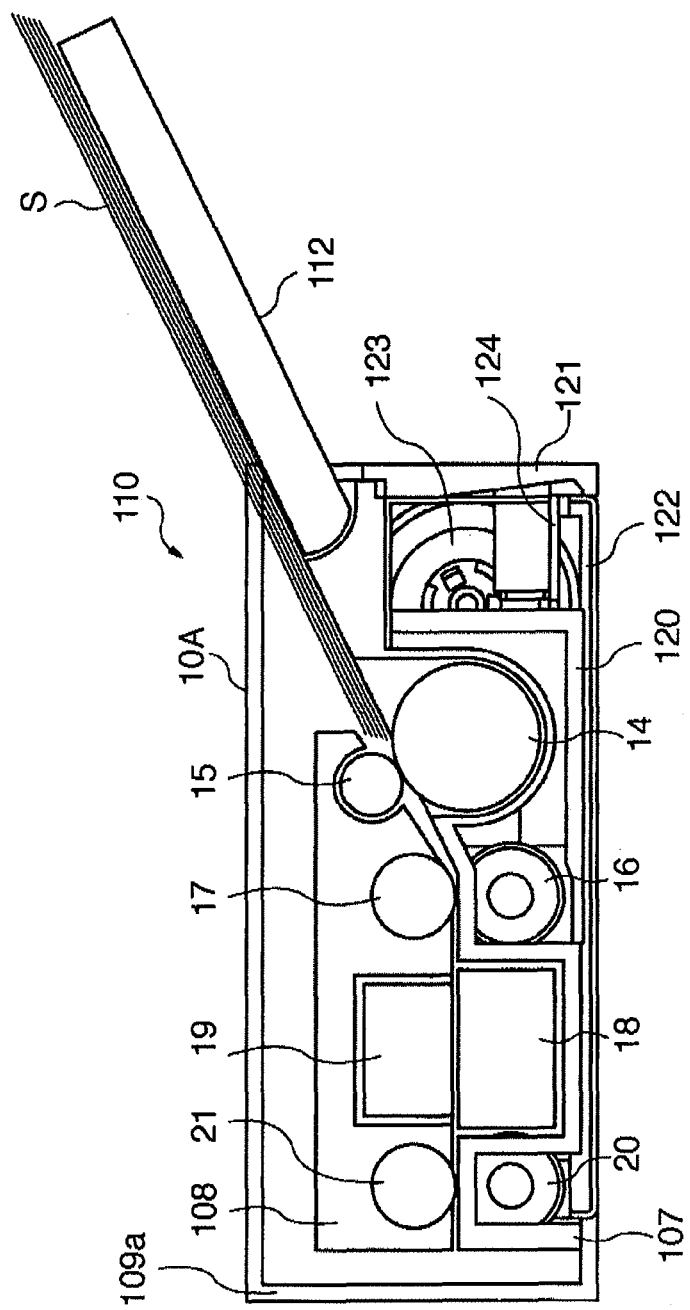
FIG. 11 is a schematic sectional view for explaining an image reading apparatus having a rotation member driving device as an example of the embodiment of the present invention.

In the scanner apparatus 110 shown in FIG. 11, a paper feed tray 112 on which document sheets S are stacked is supported by an apparatus main body housing 10A so as to be able to open/close the paper feed tray 112. When the paper feed tray 112 is closed, it covers the document feed port for the document sheets S. When the paper feed tray 112 is open (state in FIG. 11), the document sheets S can be stacked on it.

The apparatus main body housing 10A stores a lower frame 107, and an upper frame 108 which is supported by the lower frame 107 so as to be able to open/close the upper frame 108.

In the lower frame 107, a paper feed roller 14, conveyance roller 16, reading sensor 18, and conveyance roller 20 are arranged sequentially toward the downstream side in the document conveyance direction. The lower frame 107 rotatably supports the roller shafts of the rollers 14, 16, and 20.

Figure 12:
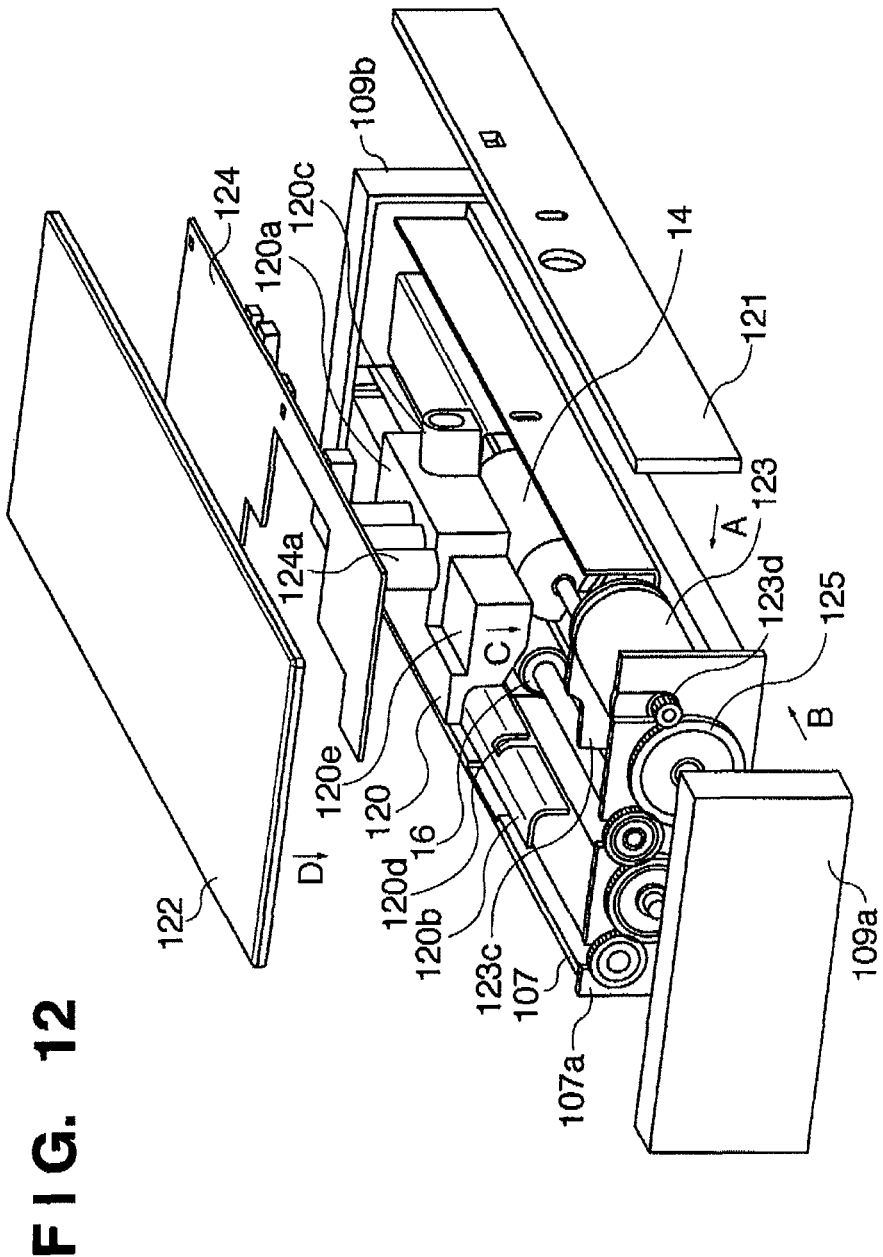
FIG. 12 is an exploded perspective view of the main body housing of the image reading apparatus shown in FIG. 11 when viewed from the bottom.

In FIG. 12, a driving motor (driving unit) 123 which transmits a driving force to the roller shafts of the rollers 14, 16, and 20 via a gear mechanism 125, and a control board 124 are arranged in the lower frame 107.

In the third embodiment, for example, the driving shaft of the driving motor 123 projects from two ends in the axial direction. An encoder (plate to be read) 123a (see FIG. 13) is attached to one end of the driving shaft. Although not shown, the encoder 123a is a slit encoder which has a plurality of small holes (slits) formed in the rotational direction, and rotates together with the rotating shaft of the motor 123. In the third embodiment, the driving motor 123 having the plate to be read is an example of the rotation member driving unit.

An optical sensor 123b (see FIG. 13) is attached via a plate-like bracket 123c to the end face of the driving motor 123 on the side of the encoder 123a, and reads the slits of the encoder 123a when the driving motor 123 rotates.

Based on rotation information of the encoder 123a that is read by the optical sensor 123b, a control unit mounted on the control board 124 controls driving of the driving motor 123, and detects a sheet conveyance position and the like.

In the upper frame 108, a separation roller 15 which forms a roller pair together with the paper feed roller 14, a conveyance roller 17 which forms a conveyance roller pair together with the conveyance roller 16, and a conveyance roller 21 which forms a discharge roller pair together with the conveyance roller 20 are arranged.

The upper frame 108 rotatably supports the roller shafts of the rollers 15, 17, and 21. A reading sensor 19 is interposed between the conveyance roller 17 and the conveyance roller 21 and faces the reading sensor 18.

A plurality of document sheets S stacked on the paper feed tray 112 are separated and fed one by one from the bottom to a conveyance path by the paper feed roller 14 and separation roller 15. The document sheet S fed to the conveyance path is conveyed downstream by the pair of conveyance rollers 16 and 17.

The reading sensors 18 and 19 read images on the obverse and reverse surfaces of the document sheet S conveyed downstream along the conveyance path. Then, the document sheet S is discharged from the apparatus by the discharge roller pair formed by the conveyance rollers 20 and 21.

The control unit on the control board 124 establishes synchronization between the feed amount of the document sheet S conveyed by the pair of conveyance rollers 16 and 17, and the reading signal of the encoder 123a by the optical sensor 123b. Accordingly, the document image reading operation by the reading sensors 18 and 19 can be accurately executed.

Image data read by the reading sensors 18 and 19 are transferred to an external apparatus (not shown) via a communication I/F mounted on the control board 124.

Figure 13:
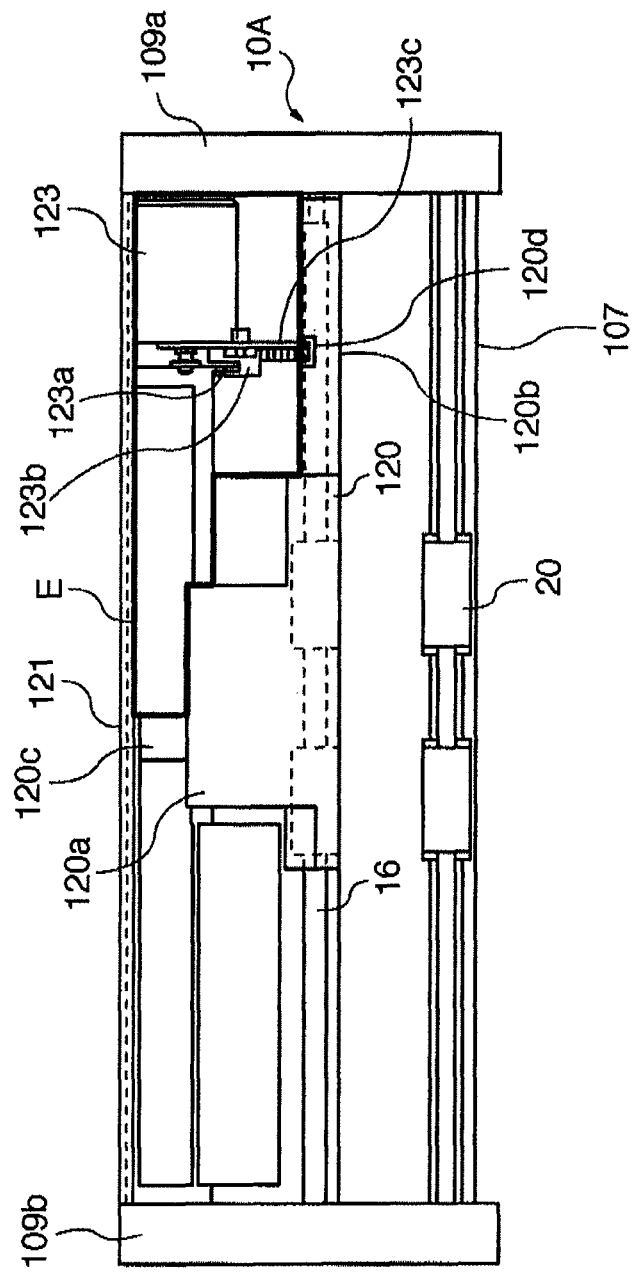
FIG. 13 is a plan view for explaining the internal structure of the image reading apparatus shown in FIG. 11 when viewed from the bottom.

FIG. 12 is an exploded perspective view of the apparatus main body housing 10A of the scanner apparatus 110 shown in FIG. 11 when viewed from the bottom. FIG. 13 is a plan view for explaining the internal structure of the scanner apparatus 110 shown in FIG. 11 when viewed from the bottom.

In the third embodiment, the apparatus main body housing 10A stores the building members of the scanner apparatus 110. In the third embodiment, as shown in FIG. 12, the apparatus main body housing 10A is divided into a plurality of separate members (members which form the apparatus main body housing 10A). More specifically, the apparatus main body housing 10A is divided into side plates 109a and 109b, a roller housing 120, a back plate 121, and a base plate 122. Note that the building members of the apparatus main body housing 10A substantially include even a casing made up of a side plate 107a of the lower frame 107 on a side opposite to the back plate 121, and a member which covers internal functional units.

The side plates 109a and 109b are engaged with the lower frame 107 on two sides in the axial direction of the pair of conveyance rollers 16 and 17. The back plate 121 forms a wall of the apparatus main body housing 10A on the upstream side in the document conveyance direction.

The driving motor 123 is arranged along the inner wall surface of the back plate 121 at a corner formed by the side plate 109a out of the side plates 109a and 109b and the back plate 121 so that the axis of the driving motor 123 becomes almost parallel to that of the pair of conveyance rollers 16 and 17 and the like.

A driving shaft of the driving motor 123 that is opposite to a driving shaft to which the encoder 123a is attached projects from the side plate 107a of the lower frame 107 toward the side plate 109a of the apparatus main body housing 10A. A driving gear 123d is fixed to the projecting end.

The driving force of the driving motor 123 is transmitted via the gear mechanism 125 including the driving gear 123d to the roller shafts of the paper feed roller 14 and conveyance rollers 16 and 17 that project from the side plate 107a of the lower frame 107.

The roller housing 120 is a member which separates the paper feed roller 14 and conveyance rollers 16 and 20 from the driving motor 123. The roller housing 120 is arranged along the roller shaft.

An overhang 120a is formed at almost the center of the roller housing 120 in the axial direction and overhangs to the vicinity of the back plate 121. A projection 120c which reaches the back plate 121 is formed at the distal end face of the overhang 120a.

The projection 120c is arranged on a side apart from the base plate 122 from a surface of the overhang 120a that faces the base plate 122. On the side of the side plate 109a, the overhang 120a has a step surface 120e which is formed at almost the same level as the projection 120c.

An extending portion 120b is formed on a side surface of the overhang 120a on the downstream side of the step surface 120e in the document conveyance direction. The extending portion 120b extends to the side plate 107a of the lower frame 107.

A clearance groove 120d is formed in the extending portion 120b to relieve the bracket 123c of the optical sensor 123b attached to the motor main body of the driving motor 123.

As shown in FIG. 12, the back plate 121 and the side plates 109a and 109b are attached to the lower frame 107 in directions indicated by arrows A and B, respectively. The roller housing 120 and base plate 122 are attached to the lower frame 107 in directions indicated by arrows C and D. As a result, the apparatus main body housing 10A is assembled.

In this assembly, the roller housing 120 separates the rollers 14, 16, and 20 from the driving motor 123. The side plates 109a and 109b, back plate 121, and base plate 122 separate the driving motor 123 from the outside. Hence, a dustproof space is defined as a space which surrounds the encoder 123a attached to the driving motor 123. That is, members which form the apparatus main body housing 10A form the dustproof structure of the encoder 123a attached to the driving motor 123.

The control board 124 is arranged on the projection 120c and step surface 120e of the roller housing 120. A mounted member 124a on the control board 124 is arranged in a dustproof space E (see FIG. 13) formed on a side of the projection 120c close to the side plate 109a.

As described above, in the third embodiment, the roller housing 120 separates the rollers 14, 16, and 20 from the driving motor 123. This structure can prevent wastepaper, dust, and the like attached to the rollers 14, 16, and 20 from entering the driving motor 123. The roller shafts of the rollers 14, 16, and 20 project from the side plate 107a of the lower frame 107, preventing dust or the like from entering the driving motor 123 through openings formed in the side plate 107a.

The side plates 109a and 109b, back plate 121, and base plate 122 separate the driving motor 123 from the outside, preventing dust or the like from entering the driving motor 123 from the outside.

In this manner, the third embodiment ensures dust proof of the encoder 123a. This obviates the need for attaching a case to the driving motor 123 to cover the encoder 123a. While omitting the case, unlike a conventional motor encoder, members which form the apparatus main body housing 10A define a dustproof space. The encoder 123a is arranged in the dustproof space, ensuring dust proof of the encoder 123a.

Since the case can be omitted, unlike a conventional encoder, the space can be saved, downsizing the apparatus. In addition, the number of components can be decreased, reducing the weight and cost.

In the third embodiment, the mounted member 124a on the control board 124 can be arranged along the dustproof space E formed on a side of the projection 120c close to the side plate 109a. The control board 124 can be arranged close to the vicinity of the encoder 123a attached to the driving motor 123, effectively using the space in the apparatus.

Note that the arrangement of the present invention is not limited to those exemplified in the embodiment. The materials, shapes, dimensions, forms, numbers, arrangement portions, and the like can be properly changed without departing from the scope of the invention.

The present invention has been described based on the embodiments, but is not limited to them.

For example, in one embodiment described above, the driving motor 123 is arranged at the corner of the apparatus main body housing 10A, but the present invention is not limited to this.

For example, the rotation member driving unit such as an encoder-attached driving motor may be arranged inside the apparatus main body housing. In this case, inner walls are arranged as the apparatus main body housing and define a dustproof space as a space which surrounds a plate to be read such as the encoder.

This structure can obtain the same effects as those of the above-described embodiment. The housing member which forms the casing of the apparatus can further reduce the influence of dust or the like which enters the apparatus substantially from the outside.

One embodiment described above has exemplified a slit plate as the plate to be read. However, the present invention is not limited to this, and may adopt a shield plate as the plate to be read. In the present invention, a wide range of plates to be read are protected. That is, the present invention is applicable to plates to be read such as a code plate having a predetermined code, and a magnetic plate.

One embodiment described above has exemplified an image reading apparatus. However, the present invention is not limited to this, and is also applicable to a document conveyance device (sheet conveyance device).

More specifically, according to the present invention, in a document conveyance device including a device main body housing storing a rotation member driving unit in which a plate to be read is attached to a driving unit, members which form the device main body housing define a dustproof space as a space which surrounds at least the plate to be read.

Even when the present invention is applied to the document conveyance device, the same effects as those of the above-described embodiment can be obtained.

The present invention is not limitedly applied to the image reading apparatus, and is also applicable to a document processing apparatus (image processing apparatus) including a document conveyance device to which the rotation member driving device is applied, and a document processing unit which performs predetermined processing for a document.

Examples of the document processing apparatus are a printer, a facsimile machine, a check scanner for a check and bill of exchange, and a multi-functional peripheral. However, the present invention is not limited to them. For example, the type of apparatus is not particularly limited as long as a dustproof space for preventing attachment of dust or the like to a plate to be read such as a slit plate attached to a driving unit such as a motor is defined in an apparatus main body housing in which the driving unit having the plate to be read is mounted.

Other Embodiments

The present invention has been described based on the first, second, and third embodiments, but is not limited to them.

For example, in the first or second embodiment, the scanner apparatus 110 has been exemplified as a peripheral apparatus. However, the present invention is not limited to this, and is applicable to a peripheral apparatus used in a form in which its control window is displayed on the information processing apparatus. For example, the present invention is also applicable to an image reading apparatus such as an image reader or multi-functional peripheral, and another peripheral apparatus such as a copying machine or printer.

In the above-described embodiments, the information processing apparatus 100 supplies power to the scanner apparatus 110. In this case, upon completely ending the use of the control program transmitted from the scanner apparatus, the management program or the like may monitor it and control to turn off the scanner apparatus.

When the scanner apparatus in the power-off state is switched to the power-on state based on the manipulation of the scanner apparatus, the control program may be retransmitted from the storage area of the scanner apparatus as long as the information processing apparatus and scanner apparatus are connected. In this case, the power supply of the scanner apparatus is basically OFF. However, standby power necessary to turn off the scanner apparatus may be ensured by a batter or received from the information processing apparatus. Alternatively, a commercial power supply may separately supply power to the scanner apparatus via an AC adaptor or the like.

Retransmission of the control program upon switching the scanner apparatus from power-off to power-on is preferably interlocked with the power-on/off control in response to, for example, pressing of a scan operation start button (operation button 115 in the first embodiment) attached to the scanner apparatus main body. The user can execute power-on and retransmission of the control program by one manipulation, further improving user friendliness.

In the above-described embodiments, the scanner apparatus 110 has been exemplified as a peripheral apparatus. However, the present invention is not limited to this, and is applicable to the following form. That is, control programs for controlling one or a plurality of peripheral apparatuses connected to an information processing apparatus are stored in one peripheral apparatus. The peripheral apparatus transmits the control programs to the information processing apparatus. By executing the control programs, the information processing apparatus can control one or a plurality of peripheral apparatuses connected to the information processing apparatus. For example, the present invention is widely applicable to a USB memory which stores various control programs, an image reader or image reading apparatus, a peripheral apparatus such as a multi-functional peripheral, copying machine, or printer, a peripheral apparatus control method, a peripheral apparatus control program, and an information processing system formed from a peripheral apparatus and information processing apparatus.

The control program for controlling the peripheral apparatus connected to an information processing apparatus and a management program for managing the control program may be parts of a peripheral apparatus operating program. The peripheral apparatus operating program is stored in ROM 213 of the scanner apparatus 110. The peripheral apparatus operating program is transmitted to the personal computer 100 worked as the information processing apparatus via the USB interface worked as the communication unit. CPU 201 of the personal computer 100 executes the received peripheral apparatus operating program. Specifically, CPU 201 executes the control program to write an instruction information into RAM 214 of the scanner apparatus 110 to control the scanner apparatus 110 worked as the peripheral apparatus. CPU 211 of the scanner apparatus 110 reads out the written instruction information from RAM 214 and controls the image reader unit 216 or the like of the scanner apparatus 110 according to the instruction information. Moreover, CPU 201 of the personal computer 100 executes the received peripheral apparatus operating program to determine the whether or not the information processing apparatus have finished use of the control program. CPU 201 functions as a controller for controlling a display object (user interface) of the personal computer 100 via the management program.

The peripheral apparatus operating program may be constituted by the capture application 319 only. Alternatively, the peripheral apparatus operating program may be constituted by the capture application 319 and the event monitoring module 318. In the latter case, an operation monitoring program for monitoring operation to the peripheral apparatus may be remained in the peripheral apparatus. The capture application 319 is constituted by the control program and a part of the management program (a operation monitoring function for monitoring an operation window for operating the peripheral apparatus). The event monitoring module 318 may be constituted by a reaming functions of the management program (an operation monitoring function for monitoring operation of the peripheral apparatus). Functions of management program may be divided into a plurality of programs. For examples, a part of the functions is located in the capture application and remaining functions are located in the event monitoring module 318.

Figure 14:
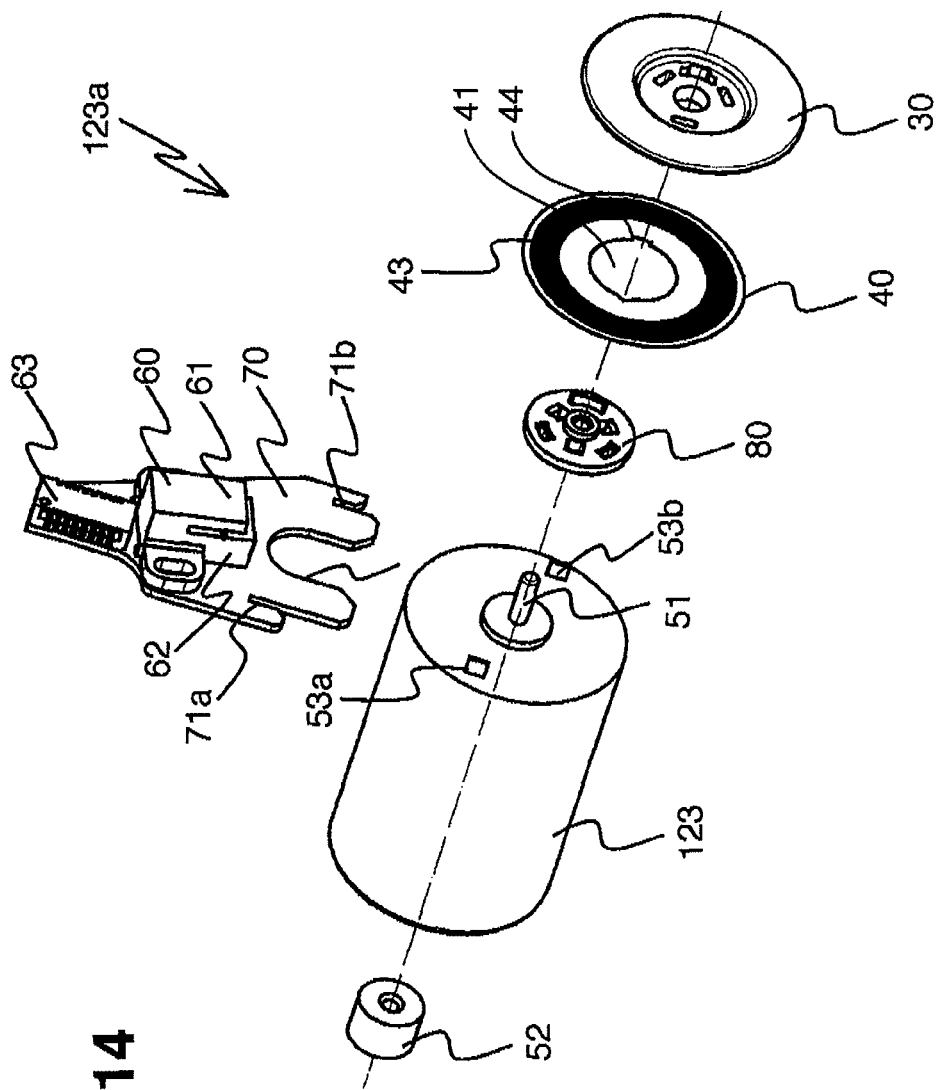
FIG. 14 is an exploded perspective view showing the schematic structures of a motor and signal detector.
Figure 15:
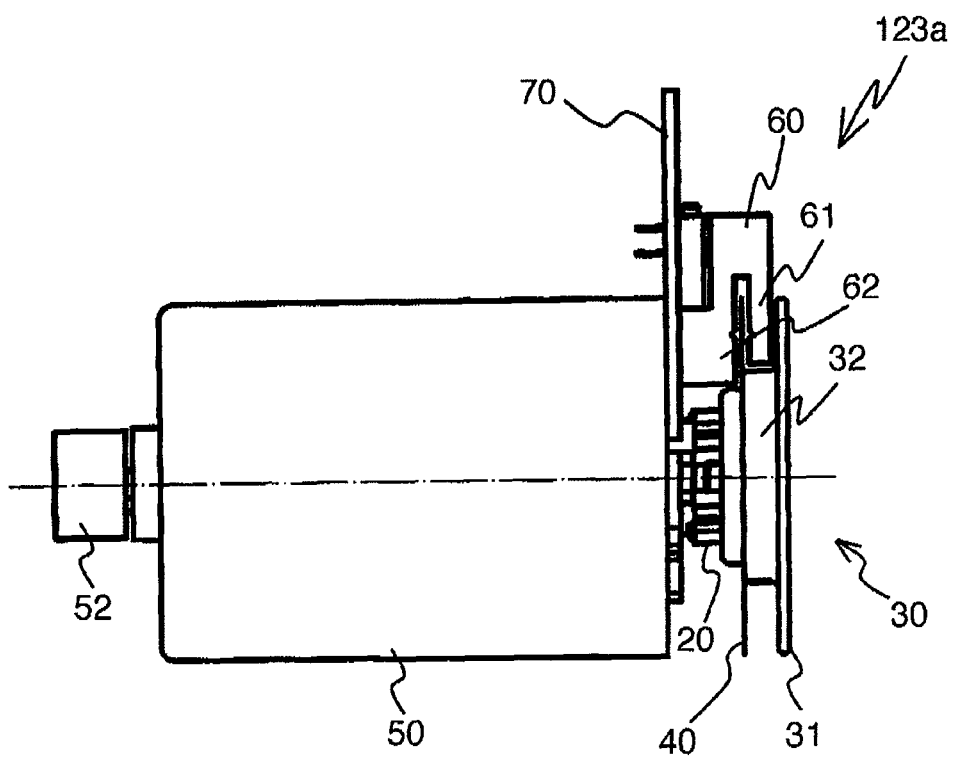
FIG. 15 is a schematic side view showing the structures of the motor and signal detector.

The structures of the driving motor 123 and encoder 123a will be exemplified. FIG. 14 is an exploded perspective view showing the schematic structure of the encoder 123a having a plate-to-be-read fixing assembly using a plate-to-be-read fixing member. FIG. 15 is a schematic side view showing a motor and the encoder 123a in FIG. 14.

In this embodiment, a plate 40 to be read is formed from a disk-like slit plate. More specifically, an insertion hole 41 is formed at the center of the plate 40 to be read, and extends in the direction of thickness. A region 43 to be read is formed around the insertion hole 41. In the region 43 to be read, a plurality of radially extending slits are individually formed side by side along the periphery. The region 43 to be read is used to detect the rotation state of the plate to be read. A notch 44 is formed at a portion of the plate 40 to be read that corresponds to the periphery of the insertion hole 41, and is used for positioning in attachment to a fitting member 80.

In the embodiment, a plate-to-be-read fixing member 30 which is engaged with the fitting member 80 has the same outer shape and outer diameter as those of the plate 40 to be read, that is, the same circular shape as that of the plate 40 to be read. More specifically, the plate-to-be-read fixing member 30 has an almost disk-like shape. The plate-to-be-read fixing member 30 has a large-diameter portion 31 and small-diameter portion 32. The large-diameter portion 31 has the same outer diameter as that of the plate 40 to be read. The small-diameter portion 32 is formed at the center of the large-diameter portion 31 on one surface and projects by a predetermined amount. The outer diameter of the small-diameter portion 32 is smaller than that of the large-diameter portion 31 and larger than the aperture of the insertion hole 41 of the plate 40 to be read.

As shown in FIGS. 14 and 15, the encoder 123a in the embodiment is a rotary encoder. By using the plate-to-be-read fixing member 30 in the embodiment, the plate 40 to be read is attached and fixed to a rotating shaft 51 which projects from the driving motor 123 which is driven to rotate. A signal detector 60 is located near the end of the plate 40 to be read and detects the rotation state of the plate 40 to be read as a signal.

The rotating shaft 51 is attached to one end of the driving motor 123 which is driven to rotate, and projects by a predetermined amount. A pinion gear 52 is attached to the other end to transmit the rotation driving of the rotating shaft 51 to the outside.

The signal detector 60 is a transmission optical sensor such as a photointerrupter. More specifically, the signal detector 60 includes a light-emitting portion 61 and light-receiving portion 62. The light-emitting portion 61 emits light to the region 43 to be read on the plate 40 to be read. The light-receiving portion 62 is arranged on a surface of the plate 40 to be read that opposes the light-emitting portion 61. The light-receiving portion 62 receives light having passed through the slits of the plate 40 to be read. A gap is formed between the light-emitting portion 61 and the light-receiving portion 62 so that the end of the rotating plate 40 to be read, that is, an end including the region 43 to be read passes through the gap. The rotation state of the plate 40 to be read which passes through the gap is detected as a signal.

If the light-emitting portion 61 or light-receiving portion 62 is arranged in a gap between the plate 40 to be read and the plate-to-be-read fixing member 30, the space can be saved. In the embodiment, the light-emitting portion 61 is interposed between the plate 40 to be read and the plate-to-be-read fixing member 30. Further, the light-receiving portion 62 is arranged on a side opposite to the light-emitting portion 61 and at a portion corresponding to the outer surface of the fitting member 80. This can downsize the encoder 123a. As a matter of course, the same effects as those described above can be obtained by interposing the light-emitting portion 61 between the plate 40 to be read and the plate-to-be-read fixing member 30.

The signal detector 60 has a connector 63 for transferring a signal to the outside. The signal detector 60 is mounted on a board 70 for attaching the signal detector 60 to the end face of the driving motor 123. The board 70 has first fitting grooves 71a and 71b which are fitted on two projections 53a and 53b disposed on the end face of the driving motor 123 concentrically with the rotating shaft 51. The end of the board 70 has a second fitting groove 72 which is fitted on a proximal end 81 of the rotating shaft 51 of the driving motor 123.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-159098, filed Jul. 3, 2009, No. 2009-168328, filed Jul. 17, 2009, No. 2009-158753, filed Jul. 3, 2009 and No. 2010-145827, filed Jun. 28, 2010, which are hereby incorporated by reference herein in their entirety.

What is claimed is:

1. A peripheral apparatus comprising:
    a storage unit which stores a control program for controlling the peripheral apparatus connected to an information processing apparatus, and a management program for managing the control program; and
    a control unit which controls an operation of the peripheral apparatus based on instruction information written in said storage unit from the information processing apparatus which recognizes the peripheral apparatus as an external storage device, wherein the control program is executed on the information processing apparatus after being loaded to the information processing apparatus from the external storage device, and
    wherein, after a control object for controlling the peripheral apparatus which is a display object of the information processing apparatus changes from a display state to a non-display state due to end of use of the control program, the management program determines whether or not the control unit writes in said storage unit operation information indicating that an operation unit provided with the peripheral apparatus is operated by a user, and functionalizes the information processing apparatus to return the control object from the non-display state to the display state when the management program determines that the control unit writes the operation information.

2. The peripheral apparatus according to claim 1, wherein the management program determines whether the use of the control program has ended in response to a manipulation via the control object that is displayed on the information processing apparatus, and causes the information processing apparatus to control a display form of the control object serving as the display object of the information processing apparatus, based on a use state of the control program.

3. The peripheral apparatus according to claim 1, wherein the management program causes the information processing apparatus to switch the display form of the control object to the non-display state when a manipulation to switch the display form of the control object from the display state to the non-display state is performed by a user, wherein the control program is still executed at the non-display state.

4. The peripheral apparatus according to claim 1, further comprising:
    an instruction unit which issues an instruction to return the control object displayed on a display area of the information processing apparatus according to the control program from the non-display state to the display state; and
    a writing unit which writes instruction information as the operation information in said storage unit upon issuing the instruction,
    wherein, to return the control object from the non-display state to the display state when the management program determines that the control unit writes the operation information, the management program causes the information processing apparatus to function as
    a determination unit which determines whether the instruction information has been written in said storage unit, and
    a display switching unit which switches the control object from the non-display state to the display state upon writing the instruction information by sending a message for switching the control object from the non-display state to the display state.

5. The peripheral apparatus according to claim 1, wherein the management program causes the information processing apparatus to function as
    a determination unit which determines that the control program has completely ended when the control program has been released from a memory of the information processing apparatus, and
    a reloading unit which reloads the control program stored in said storage unit into the memory of the information processing apparatus when the control program has been released from the memory of the information processing apparatus and has completely ended.

6. An information peripheral apparatus comprising:
    a storage unit which stores a peripheral apparatus operating program including a control program for controlling the peripheral apparatus connected to an information processing apparatus, and a management program for managing the control program; and
    a control unit which controls an operation of the peripheral apparatus based on instruction information written in said storage unit by the information processing apparatus which recognizes the peripheral apparatus as an external storage device, wherein the control program is executed on the information processing apparatus after being loaded to the information processing apparatus from the external storage device, and
    wherein, after a control object for controlling the peripheral apparatus which is a display object of the information processing apparatus changes from a display state to a non-display state due to end of use of the control program, the peripheral apparatus operating program causing a processor of the information processing apparatus to determine whether or not the control unit writes in said storage unit operation information indicating that an operation unit provided with the peripheral apparatus is operated by a user, and functionalizes the information processing apparatus to return the control object from the non-display state to the display state when the peripheral apparatus operating program determines that the control unit writes the operation information.

* * * * *